United States Patent
Lai et al.

(10) Patent No.: US 12,231,613 B2
(45) Date of Patent: Feb. 18, 2025

(54) SYSTEM AND METHOD FOR DISPLAYING AN OBJECT WITH DEPTHS

(71) Applicant: HES IP HOLDINGS, LLC, Spring, TX (US)

(72) Inventors: Jiunn-Yiing Lai, New Taipei (TW); Feng-Chun Yeh, Taipei (TW); Guo-Hsuan Chen, New Taipei (TW)

(73) Assignee: HES IP HOLDINGS, LLC, Austin, TX (US)

( * ) Notice: Subject to any disclaimer, the term of this patent is extended or adjusted under 35 U.S.C. 154(b) by 964 days.

(21) Appl. No.: 17/261,564

(22) PCT Filed: Nov. 6, 2020

(86) PCT No.: PCT/US2020/059317
§ 371 (c)(1),
(2) Date: Jan. 19, 2021

(87) PCT Pub. No.: WO2021/092314
PCT Pub. Date: May 14, 2021

(65) Prior Publication Data
US 2022/0311992 A1  Sep. 29, 2022

Related U.S. Application Data

(60) Provisional application No. 63/085,172, filed on Sep. 30, 2020, provisional application No. 63/041,740, (Continued)

(51) Int. Cl.
*H04N 13/344* (2018.01)
*G02B 27/01* (2006.01)

(52) U.S. Cl.
CPC ....... *H04N 13/344* (2018.05); *G02B 27/0172* (2013.01); *G02B 2027/0134* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 1,022,856 | A | 4/1912 | Marinics |
| 1,072,216 | A | 9/1913 | Dunn |

(Continued)

FOREIGN PATENT DOCUMENTS

| | | | |
|---|---|---|---|
| CN | 102014732 A | | 4/2011 |
| CN | 102750418 A | | 10/2012 |

(Continued)

OTHER PUBLICATIONS

Office Action issued on Aug. 31, 2023, in corresponding, U.S. Appl. No. 18/331,910.

(Continued)

*Primary Examiner* — Heather R Jones
(74) *Attorney, Agent, or Firm* — Chen Yoshimura LLP

(57) ABSTRACT

An object displaying system includes a right light signal generator, a left light signal generator, a right combiner, and a left combiner. The right light signal generator generates right light signals for an object. The right combiner receives and redirects the right light signals towards one retina of a viewer to display multiple right pixels of the object. The left light signal generator generates leftght signals for the object. The left combiner receives and redirects the left light signals towards the other retina of the viewer to display multiple left pixels of the object. A first redirected right light signal and a corresponding first redirected left light signal are perceived by the viewer to display a first virtual binocular pixel of the object with a first depth that is related to a first angle between the first redirected right light signal and the corresponding first redirected left light signal.

41 Claims, 22 Drawing Sheets

Related U.S. Application Data filed on Jun. 19, 2020, provisional application No. 62/978,322, filed on Feb. 19, 2020, provisional application No. 62/931,228, filed on Nov. 6, 2019.

(56) References Cited

U.S. PATENT DOCUMENTS

| | | |
|---|---|---|
| 4,953,961 A | 9/1990 | Ubhayakar |
| 5,754,344 A | 5/1998 | Fujiyama |
| 6,111,597 A | 8/2000 | Tabata |
| 6,454,411 B1 | 9/2002 | Trumbull |
| 6,578,068 B1 | 6/2003 | Bowman-Amuah |
| 8,123,353 B2 | 2/2012 | Biernat et al. |
| 9,028,067 B1 | 5/2015 | Fleischman et al. |
| 9,186,293 B2 | 11/2015 | Krenik |
| 9,239,453 B2 | 1/2016 | Cheng et al. |
| 9,279,972 B2 | 3/2016 | Judkewitz et al. |
| 9,297,945 B2 | 3/2016 | Ide et al. |
| 9,304,316 B2 | 4/2016 | Weiss et al. |
| 9,319,674 B2 | 4/2016 | Kim et al. |
| 9,348,144 B2 | 5/2016 | Kobayashi |
| 9,377,627 B2 | 6/2016 | Watanabe et al. |
| 9,395,543 B2 | 7/2016 | Lamb et al. |
| 9,400,215 B2 | 7/2016 | Islam |
| 9,408,539 B2 | 8/2016 | Tearney et al. |
| 9,435,956 B1 | 9/2016 | Xu et al. |
| 9,456,116 B2 | 9/2016 | Lapstun |
| 9,459,456 B2 | 10/2016 | Kobayashi |
| 9,476,769 B2 | 10/2016 | Islam |
| 9,485,392 B1 | 11/2016 | Lettington et al. |
| 9,488,837 B2 | 11/2016 | Nister et al. |
| 9,492,083 B2 | 11/2016 | Rege et al. |
| 9,494,800 B2 | 11/2016 | Border et al. |
| 9,504,376 B2 | 11/2016 | Neal et al. |
| 9,529,191 B2 | 12/2016 | Sverdrup et al. |
| 9,529,196 B1 | 12/2016 | Sade |
| 9,555,589 B1 | 1/2017 | Ambur et al. |
| 9,557,568 B1 | 1/2017 | Ouderkirk et al. |
| 9,576,398 B1 | 2/2017 | Zehner et al. |
| 9,581,744 B1 | 2/2017 | Yun et al. |
| 9,581,827 B1 | 2/2017 | Wong et al. |
| 9,599,761 B1 | 3/2017 | Ambur et al. |
| 9,618,743 B2 | 4/2017 | Saito |
| 9,664,615 B2 | 5/2017 | Bouma et al. |
| 9,671,566 B2 | 6/2017 | Abovitz et al. |
| 9,678,338 B1 | 6/2017 | Bamberger et al. |
| 9,715,114 B2 | 7/2017 | Yun et al. |
| 9,723,976 B2 | 8/2017 | Tesar |
| 9,726,539 B2 | 8/2017 | Islam |
| 9,766,449 B2 | 9/2017 | Bailey et al. |
| 9,772,495 B2 | 9/2017 | Tam et al. |
| 9,784,975 B2 | 10/2017 | Aruga |
| 9,800,844 B2 | 10/2017 | Nakahara et al. |
| 9,817,236 B2 | 11/2017 | Yamazaki et al. |
| 9,823,474 B2 | 11/2017 | Evans et al. |
| 9,829,616 B2 | 11/2017 | Yun et al. |
| 9,835,777 B2 | 12/2017 | Ouderkirk et al. |
| 9,851,566 B2 | 12/2017 | Yajima et al. |
| 9,851,568 B2 | 12/2017 | Theytaz |
| 9,857,170 B2 | 1/2018 | Abovitz et al. |
| 9,857,591 B2 | 1/2018 | Welch et al. |
| 9,872,606 B2 | 1/2018 | Yeoh et al. |
| 9,874,744 B2 | 1/2018 | Bailey et al. |
| 9,921,396 B2 | 3/2018 | Ranalli et al. |
| 9,927,611 B2 | 3/2018 | Rudy et al. |
| 9,945,998 B2 | 4/2018 | Ouderkirk et al. |
| 9,945,999 B2 | 4/2018 | Wong et al. |
| 9,946,067 B1 | 4/2018 | Bamberger et al. |
| 9,952,371 B2 | 4/2018 | Ambur et al. |
| 9,964,755 B2 | 5/2018 | Redding et al. |
| 9,983,397 B2 | 5/2018 | Horstmeyer et al. |
| 9,989,765 B2 | 6/2018 | Jepsen |
| 9,995,857 B2 | 6/2018 | Evans et al. |
| 9,995,939 B2 | 6/2018 | Yun et al. |
| 10,001,651 B2 | 6/2018 | Noguchi et al. |
| 10,007,035 B2 | 6/2018 | Ouderkirk et al. |
| 10,007,043 B2 | 6/2018 | Ambur et al. |
| 10,012,829 B2 | 7/2018 | Bailey et al. |
| 10,012,838 B2 | 7/2018 | Border |
| 10,041,832 B2 | 8/2018 | Islam |
| 10,042,165 B2 | 8/2018 | Jepsen et al. |
| 10,061,062 B2 | 8/2018 | Sscmidtlin |
| 10,061,111 B2 | 8/2018 | Hillman |
| 10,067,337 B2 | 9/2018 | Bailey et al. |
| 10,073,266 B2 | 9/2018 | Osterhout |
| 10,073,270 B2 | 9/2018 | Fujishiro |
| 10,078,164 B2 | 9/2018 | Yun et al. |
| 10,078,220 B2 | 9/2018 | Alexander et al. |
| 10,101,571 B2 | 10/2018 | Andre et al. |
| 10,101,586 B2 | 10/2018 | Fujimaki et al. |
| 10,133,075 B2 | 11/2018 | Bailey et al. |
| 10,139,632 B2 | 11/2018 | Border et al. |
| 10,151,926 B2 | 12/2018 | Bailey |
| 10,162,161 B2 | 12/2018 | Horstmeyer et al. |
| 10,162,183 B2 | 12/2018 | Ide |
| 10,168,525 B2 | 1/2019 | Kim et al. |
| 10,175,484 B2 | 1/2019 | Yajima et al. |
| 10,175,488 B2 | 1/2019 | Bailey et al. |
| 10,185,154 B2 | 1/2019 | Popovich et al. |
| 10,191,283 B2 | 1/2019 | Alexander et al. |
| 10,197,805 B2 | 2/2019 | Bailey et al. |
| 10,209,517 B2 | 2/2019 | Popovich et al. |
| 10,222,618 B2 | 3/2019 | Border et al. |
| 10,222,621 B2 | 3/2019 | Wang et al. |
| 10,234,687 B2 | 3/2019 | Welch et al. |
| 10,234,696 B2 | 3/2019 | Popovich et al. |
| 10,241,336 B2 | 3/2019 | Ide et al. |
| 10,261,313 B1 | 4/2019 | Bamberger et al. |
| 10,268,041 B2 | 4/2019 | Davis |
| 10,274,736 B2 | 4/2019 | Alexander et al. |
| 10,277,874 B2 | 4/2019 | Xu |
| 10,302,950 B2 | 5/2019 | Ouderkirk et al. |
| 10,303,246 B2 | 5/2019 | Vidal et al. |
| 10,317,656 B2 | 6/2019 | Dubois |
| 10,330,777 B2 | 6/2019 | Popovich et al. |
| 10,330,930 B2 | 6/2019 | Wong et al. |
| 10,335,572 B1 | 7/2019 | Kumar |
| 10,338,380 B2 | 7/2019 | Yun et al. |
| 10,338,393 B2 | 7/2019 | Yun et al. |
| 10,338,400 B2 | 7/2019 | Connor |
| 10,345,596 B2 | 7/2019 | Morrison |
| 10,345,599 B2 | 7/2019 | Jepsen |
| 10,349,818 B2 | 7/2019 | Yeoh et al. |
| 10,359,629 B2 | 7/2019 | Jepsen |
| 10,365,492 B2 | 7/2019 | Holland et al. |
| 10,371,892 B2 | 8/2019 | Zheng et al. |
| 10,394,034 B2 | 8/2019 | Reshidko et al. |
| 10,409,057 B2 | 9/2019 | Aleem et al. |
| 10,409,069 B2 | 9/2019 | Noguchi et al. |
| 10,409,079 B2 | 9/2019 | Dewald et al. |
| 10,416,452 B2 | 9/2019 | Cheng et al. |
| 10,419,665 B2 | 9/2019 | Ou et al. |
| 10,422,995 B2 | 9/2019 | Haddick |
| 10,429,639 B2 | 10/2019 | Lapstun |
| 10,429,648 B2 | 10/2019 | Sverdrup |
| 10,437,061 B2 | 10/2019 | Jepsen |
| 10,437,074 B2 | 10/2019 | Holland et al. |
| 10,444,496 B2 | 10/2019 | Ambur et al. |
| 10,444,508 B2 | 10/2019 | Urey et al. |
| 10,451,876 B2 | 10/2019 | Jepsen |
| 10,451,881 B2 | 10/2019 | Bailey |
| 10,459,220 B2 | 10/2019 | Aleem et al. |
| 10,459,221 B2 | 10/2019 | Alexander et al. |
| 10,459,222 B2 | 10/2019 | Alexander et al. |
| 10,459,223 B2 | 10/2019 | Alexander et al. |
| 10,459,231 B2 | 10/2019 | Miller et al. |
| 10,459,305 B2 | 10/2019 | Shi et al. |
| 10,467,770 B2 | 11/2019 | Sato et al. |
| 10,473,459 B2 | 11/2019 | Abovitz et al. |
| 10,481,317 B2 | 11/2019 | Peroz et al. |
| 10,481,684 B2 | 11/2019 | Lopes et al. |
| 10,482,676 B2 | 11/2019 | Yuan et al. |
| 10,488,584 B2 | 11/2019 | Karafin et al. |
| 10,488,661 B2 | 11/2019 | Alexander et al. |
| 10,488,662 B2 | 11/2019 | Holland et al. |

(56) References Cited

U.S. PATENT DOCUMENTS

| | | |
|---|---|---|
| 10,510,137 B1 | 12/2019 | Kitain et al. |
| 10,520,721 B2 | 12/2019 | Nowatzyk |
| 10,520,730 B2 | 12/2019 | Bouchier et al. |
| 10,527,851 B2 | 1/2020 | Lin et al. |
| 10,534,129 B2 | 1/2020 | Tearney et al. |
| 10,534,173 B2 | 1/2020 | Jepsen |
| 10,554,940 B1 | 2/2020 | Ghazaryan |
| 10,558,047 B2 | 2/2020 | Samec et al. |
| 10,564,427 B2 | 2/2020 | Ouderkirk et al. |
| 10,606,161 B2 | 3/2020 | Hirata et al. |
| 10,616,568 B1 | 4/2020 | Lin et al. |
| 10,663,727 B2 | 5/2020 | Ouderkirk et al. |
| 10,670,867 B2 | 6/2020 | Yun et al. |
| 10,678,052 B2 | 6/2020 | Ouderkirk et al. |
| 10,706,600 B1 | 7/2020 | Yoon et al. |
| 10,747,002 B2 | 8/2020 | Yun et al. |
| 10,747,003 B2 | 8/2020 | Ouderkirk et al. |
| 10,754,159 B2 | 8/2020 | Ouderkirk et al. |
| 10,838,208 B2 | 11/2020 | Ouderkirk et al. |
| 10,921,594 B2 | 2/2021 | Ambur et al. |
| 11,079,601 B2 | 8/2021 | Greenberg |
| 11,256,092 B2 | 2/2022 | Shamir et al. |
| 11,280,997 B1 | 3/2022 | Gao |
| 11,325,330 B2 | 5/2022 | Wong et al. |
| 11,435,572 B2 | 9/2022 | Yeoh et al. |
| 11,493,769 B2 | 11/2022 | Wen et al. |
| 2002/0024708 A1 | 2/2002 | Lewis et al. |
| 2002/0122217 A1 | 9/2002 | Nakajima |
| 2002/0180868 A1 | 12/2002 | Lippert et al. |
| 2004/0179254 A1 | 9/2004 | Lewis et al. |
| 2004/0233275 A1 | 11/2004 | Tomita |
| 2006/0087618 A1 | 4/2006 | Smart et al. |
| 2008/0117289 A1* | 5/2008 | Schowengerdt ..... G02B 26/005 348/E13.032 |
| 2010/0103077 A1 | 4/2010 | Sugiyama et al. |
| 2010/0149073 A1 | 6/2010 | Chaum et al. |
| 2011/0032706 A1 | 2/2011 | Mukawa |
| 2011/0116040 A1 | 5/2011 | Biernat et al. |
| 2011/0273722 A1 | 11/2011 | Charny et al. |
| 2011/0304821 A1 | 12/2011 | Tanassi et al. |
| 2012/0002163 A1 | 1/2012 | Neal |
| 2012/0050269 A1 | 3/2012 | Awaji |
| 2012/0056799 A1 | 3/2012 | Solomon |
| 2012/0056989 A1 | 3/2012 | Izumi |
| 2013/0044101 A1 | 2/2013 | Kim et al. |
| 2013/0127980 A1 | 5/2013 | Haddick et al. |
| 2013/0135295 A1 | 5/2013 | Li et al. |
| 2013/0296710 A1 | 11/2013 | Zuzak et al. |
| 2014/0211289 A1 | 7/2014 | Hino et al. |
| 2014/0368412 A1 | 12/2014 | Jacobsen et al. |
| 2015/0022783 A1 | 1/2015 | Lee et al. |
| 2015/0169070 A1* | 6/2015 | Harp ..... G06T 19/20 345/419 |
| 2015/0215608 A1 | 7/2015 | Tahara |
| 2015/0324568 A1 | 11/2015 | Publicover et al. |
| 2015/0326570 A1 | 11/2015 | Publicover et al. |
| 2015/0338915 A1 | 11/2015 | Publicover et al. |
| 2016/0000324 A1 | 1/2016 | Rege et al. |
| 2016/0004908 A1 | 1/2016 | Lundberg |
| 2016/0033771 A1 | 2/2016 | Tremblay et al. |
| 2016/0062459 A1 | 3/2016 | Publicover et al. |
| 2016/0085302 A1 | 3/2016 | Publicover et al. |
| 2016/0109705 A1 | 4/2016 | Schowengerdt |
| 2016/0109708 A1 | 4/2016 | Schowengerdt |
| 2016/0116740 A1 | 4/2016 | Takahashi et al. |
| 2016/0131912 A1 | 5/2016 | Border et al. |
| 2016/0139402 A1 | 5/2016 | Lapstun |
| 2016/0147067 A1 | 5/2016 | Hua et al. |
| 2016/0147071 A1 | 5/2016 | Fujishiro |
| 2016/0147072 A1 | 5/2016 | Yamazaki et al. |
| 2016/0150201 A1 | 5/2016 | Kilcher et al. |
| 2016/0178908 A1 | 6/2016 | Dobschal et al. |
| 2016/0187652 A1 | 6/2016 | Fujimaki et al. |
| 2016/0187653 A1 | 6/2016 | Kimura |
| 2016/0187661 A1 | 6/2016 | Yajima et al. |
| 2016/0195718 A1 | 7/2016 | Evans |
| 2016/0195721 A1 | 7/2016 | Evans |
| 2016/0209648 A1 | 7/2016 | Haddick et al. |
| 2016/0209657 A1 | 7/2016 | Popovich et al. |
| 2016/0212394 A1 | 7/2016 | Nakahara et al. |
| 2016/0216515 A1 | 7/2016 | Bouchier et al. |
| 2016/0238845 A1 | 8/2016 | Alexander et al. |
| 2016/0246441 A1 | 8/2016 | Westerman et al. |
| 2016/0274358 A1 | 9/2016 | Yajima et al. |
| 2016/0274361 A1 | 9/2016 | Border et al. |
| 2016/0274365 A1 | 9/2016 | Bailey et al. |
| 2016/0274660 A1 | 9/2016 | Publicover et al. |
| 2016/0284129 A1 | 9/2016 | Nishizawa et al. |
| 2016/0291217 A1 | 10/2016 | Furukawa et al. |
| 2016/0291326 A1 | 10/2016 | Evans et al. |
| 2016/0327779 A1 | 11/2016 | Hillman |
| 2016/0377849 A1 | 12/2016 | Onda |
| 2016/0377865 A1 | 12/2016 | Alexander et al. |
| 2016/0377866 A1 | 12/2016 | Alexander et al. |
| 2017/0003507 A1 | 1/2017 | Raval et al. |
| 2017/0010468 A1 | 1/2017 | Deering et al. |
| 2017/0017083 A1 | 1/2017 | Samec et al. |
| 2017/0027444 A1 | 2/2017 | Rege et al. |
| 2017/0027651 A1 | 2/2017 | Esterberg |
| 2017/0031160 A1 | 2/2017 | Popovich et al. |
| 2017/0038589 A1 | 2/2017 | Jepsen |
| 2017/0038590 A1 | 2/2017 | Jepsen |
| 2017/0038591 A1 | 2/2017 | Jepsen |
| 2017/0045721 A1 | 2/2017 | Charles |
| 2017/0068029 A1 | 3/2017 | Yun et al. |
| 2017/0068030 A1 | 3/2017 | Ambur et al. |
| 2017/0068091 A1 | 3/2017 | Greenberg |
| 2017/0068096 A1 | 3/2017 | Ouderkirk et al. |
| 2017/0068099 A1 | 3/2017 | Ouderkirk et al. |
| 2017/0068100 A1 | 3/2017 | Ouderkirk et al. |
| 2017/0068101 A1 | 3/2017 | Yun et al. |
| 2017/0068102 A1 | 3/2017 | Wong et al. |
| 2017/0068104 A1 | 3/2017 | Ouderkirk et al. |
| 2017/0068105 A1 | 3/2017 | Yun et al. |
| 2017/0078651 A1 | 3/2017 | Russell |
| 2017/0097449 A1 | 4/2017 | Ouderkirk et al. |
| 2017/0097453 A1 | 4/2017 | Ambur et al. |
| 2017/0097454 A1 | 4/2017 | Wong et al. |
| 2017/0097508 A1 | 4/2017 | Yun et al. |
| 2017/0115432 A1 | 4/2017 | Schmidtlin |
| 2017/0115484 A1 | 4/2017 | Yokoyama |
| 2017/0139209 A9 | 5/2017 | Evans et al. |
| 2017/0146714 A1 | 5/2017 | Ambur et al. |
| 2017/0153672 A1 | 6/2017 | Shin et al. |
| 2017/0160550 A1 | 6/2017 | Kobayashi et al. |
| 2017/0188021 A1 | 6/2017 | Lo et al. |
| 2017/0227771 A1 | 8/2017 | Sverdrup |
| 2017/0235931 A1 | 8/2017 | Publicover et al. |
| 2017/0255012 A1 | 9/2017 | Tam et al. |
| 2017/0255013 A1 | 9/2017 | Tam et al. |
| 2017/0255020 A1 | 9/2017 | Tam et al. |
| 2017/0261751 A1 | 9/2017 | Noguchi et al. |
| 2017/0269368 A1 | 9/2017 | Yun et al. |
| 2017/0285343 A1 | 10/2017 | Belenkii et al. |
| 2017/0293147 A1 | 10/2017 | Tremblay et al. |
| 2017/0295353 A1 | 10/2017 | Hwang et al. |
| 2017/0299870 A1 | 10/2017 | Urey et al. |
| 2017/0299872 A1 | 10/2017 | Ou et al. |
| 2017/0315347 A1 | 11/2017 | Juhola et al. |
| 2017/0329141 A1 | 11/2017 | Border et al. |
| 2017/0336641 A1 | 11/2017 | von und zu Liechtenstein |
| 2017/0363872 A1 | 12/2017 | Border et al. |
| 2017/0367651 A1 | 12/2017 | Tzvieli et al. |
| 2018/0003981 A1 | 1/2018 | Urey |
| 2018/0008141 A1 | 1/2018 | Krueger |
| 2018/0017815 A1 | 1/2018 | Chumbley et al. |
| 2018/0028057 A1 | 2/2018 | Oz et al. |
| 2018/0032812 A1 | 2/2018 | Sengelaub et al. |
| 2018/0039004 A1 | 2/2018 | Yun et al. |
| 2018/0039083 A1 | 2/2018 | Miller et al. |
| 2018/0039084 A1 | 2/2018 | Schowengerdt |
| 2018/0045927 A1 | 2/2018 | Heeren et al. |
| 2018/0045965 A1 | 2/2018 | Schowengerdt |
| 2018/0052320 A1 | 2/2018 | Curtis et al. |

(56) References Cited

U.S. PATENT DOCUMENTS

| | | |
|---|---|---|
| 2018/0059296 A1 | 3/2018 | Ouderkirk et al. |
| 2018/0081179 A1 | 3/2018 | Samec et al. |
| 2018/0081322 A1 | 3/2018 | Robbins et al. |
| 2018/0084245 A1 | 3/2018 | Lapstun |
| 2018/0088341 A1 | 3/2018 | Ide et al. |
| 2018/0088342 A1 | 3/2018 | Ide |
| 2018/0091805 A1 | 3/2018 | Liang et al. |
| 2018/0113303 A1 | 4/2018 | Popovich et al. |
| 2018/0120559 A1 | 5/2018 | Yeoh et al. |
| 2018/0120573 A1 | 5/2018 | Ninan et al. |
| 2018/0131926 A1 | 5/2018 | Shanks et al. |
| 2018/0140260 A1 | 5/2018 | Taguchi et al. |
| 2018/0149862 A1 | 5/2018 | Kessler et al. |
| 2018/0149863 A1 | 5/2018 | Aleem et al. |
| 2018/0149866 A1 | 5/2018 | Noguchi |
| 2018/0149874 A1 | 5/2018 | Aleem et al. |
| 2018/0157317 A1 | 6/2018 | Richter et al. |
| 2018/0180784 A1 | 6/2018 | Ouderkirk et al. |
| 2018/0180788 A1 | 6/2018 | Ambur et al. |
| 2018/0182174 A1 | 6/2018 | Choi |
| 2018/0185665 A1 | 7/2018 | Osterhout et al. |
| 2018/0196181 A1 | 7/2018 | Wong et al. |
| 2018/0203232 A1 | 7/2018 | Bouchier et al. |
| 2018/0239149 A1 | 8/2018 | Yun et al. |
| 2018/0241983 A1 | 8/2018 | Kimura |
| 2018/0246314 A1 | 8/2018 | Swager et al. |
| 2018/0246336 A1 | 8/2018 | Greenberg |
| 2018/0249150 A1 | 8/2018 | Takeda et al. |
| 2018/0249151 A1 | 8/2018 | Freeman et al. |
| 2018/0252924 A1 | 9/2018 | Jepsen |
| 2018/0252925 A1 | 9/2018 | Schowengerdt |
| 2018/0252926 A1 | 9/2018 | Alexander et al. |
| 2018/0262758 A1 | 9/2018 | El-Ghoroury et al. |
| 2018/0267222 A1 | 9/2018 | Ambur et al. |
| 2018/0267319 A1 | 9/2018 | Ouderkirk et al. |
| 2018/0275343 A1 | 9/2018 | Zheng et al. |
| 2018/0275410 A1 | 9/2018 | Yeoh et al. |
| 2018/0284438 A1 | 10/2018 | Yajima et al. |
| 2018/0284441 A1 | 10/2018 | Cobb |
| 2018/0284442 A1 | 10/2018 | Abe |
| 2018/0292908 A1 | 10/2018 | Kamoda et al. |
| 2018/0350032 A1 | 12/2018 | Bastani et al. |
| 2018/0356591 A1 | 12/2018 | Karafin et al. |
| 2018/0356640 A1 | 12/2018 | Yun et al. |
| 2018/0357817 A1 | 12/2018 | Ikekita |
| 2018/0372958 A1 | 12/2018 | Karafin et al. |
| 2019/0004228 A1 | 1/2019 | Bevensee et al. |
| 2019/0011621 A1 | 1/2019 | Karafin et al. |
| 2019/0011691 A1 | 1/2019 | Peyman |
| 2019/0011703 A1 | 1/2019 | Robaina et al. |
| 2019/0018235 A1 | 1/2019 | Ouderkirk et al. |
| 2019/0018479 A1 | 1/2019 | Minami |
| 2019/0025573 A1 | 1/2019 | Aleksov et al. |
| 2019/0025587 A1 | 1/2019 | Sharifi et al. |
| 2019/0041634 A1 | 2/2019 | Popovich et al. |
| 2019/0041648 A1 | 2/2019 | Petersen |
| 2019/0064435 A1 | 2/2019 | Karafin et al. |
| 2019/0064526 A1 | 2/2019 | Connor |
| 2019/0079302 A1 | 3/2019 | Ninan et al. |
| 2019/0084419 A1 | 3/2019 | Suzuki et al. |
| 2019/0086598 A1 | 3/2019 | Futterer |
| 2019/0086674 A1 | 3/2019 | Sinay et al. |
| 2019/0101977 A1 | 4/2019 | Armstrong-Muntner et al. |
| 2019/0121132 A1 | 4/2019 | Shamir et al. |
| 2019/0129178 A1 | 5/2019 | Patterson et al. |
| 2019/0146224 A1 | 5/2019 | Komori et al. |
| 2019/0172216 A1 | 6/2019 | Ninan et al. |
| 2019/0179149 A1 | 6/2019 | Curtis et al. |
| 2019/0179153 A1 | 6/2019 | Popovich et al. |
| 2019/0187473 A1 | 6/2019 | Tomizawa et al. |
| 2019/0196172 A1 | 6/2019 | Hillman |
| 2019/0200858 A1 | 7/2019 | Yam et al. |
| 2019/0212533 A9 | 7/2019 | Heeren et al. |
| 2019/0212565 A1 | 7/2019 | Davis |
| 2019/0222830 A1 | 7/2019 | Edwin et al. |
| 2019/0235235 A1 | 8/2019 | Ouderkirk et al. |
| 2019/0258062 A1 | 8/2019 | Aleem et al. |
| 2019/0265465 A1 | 8/2019 | Wong et al. |
| 2019/0265466 A1 | 8/2019 | Yun et al. |
| 2019/0265467 A1 | 8/2019 | Yun et al. |
| 2019/0271845 A1 | 9/2019 | Cormier et al. |
| 2019/0278091 A1 | 9/2019 | Smits et al. |
| 2019/0281279 A1 | 9/2019 | Peuhkurinen et al. |
| 2019/0285881 A1 | 9/2019 | Ilic et al. |
| 2019/0285895 A1 | 9/2019 | Fujimaki |
| 2019/0285897 A1* | 9/2019 | Topliss ............... G02B 27/0172 |
| 2019/0287495 A1 | 9/2019 | Mathur et al. |
| 2019/0293935 A1 | 9/2019 | Schneider et al. |
| 2019/0293939 A1 | 9/2019 | Sluka |
| 2019/0302436 A1 | 10/2019 | Hsu et al. |
| 2019/0320165 A1 | 10/2019 | French et al. |
| 2019/0335158 A1 | 10/2019 | Holz et al. |
| 2019/0339528 A1 | 11/2019 | Freeman et al. |
| 2019/0361250 A1 | 11/2019 | Lanman et al. |
| 2019/0384065 A1 | 12/2019 | Shau et al. |
| 2019/0391382 A1 | 12/2019 | Chung et al. |
| 2019/0391398 A1 | 12/2019 | Abou et al. |
| 2019/0391399 A1 | 12/2019 | Samec et al. |
| 2019/0391638 A1 | 12/2019 | Khaderi et al. |
| 2020/0012090 A1 | 1/2020 | Lapstun |
| 2020/0012095 A1 | 1/2020 | Edwin et al. |
| 2020/0018962 A1 | 1/2020 | Lu et al. |
| 2020/0033595 A1 | 1/2020 | Stegelmeier |
| 2020/0033603 A1 | 1/2020 | Ohkawa et al. |
| 2020/0033606 A1 | 1/2020 | Takeda et al. |
| 2020/0041787 A1 | 2/2020 | Popovich et al. |
| 2020/0041797 A1 | 2/2020 | Samec et al. |
| 2020/0049995 A1 | 2/2020 | Urey et al. |
| 2020/0064633 A1 | 2/2020 | Maimone |
| 2020/0090569 A1 | 3/2020 | Hajati et al. |
| 2020/0097065 A1 | 3/2020 | Iyer et al. |
| 2020/0117006 A1 | 4/2020 | Kollin et al. |
| 2020/0124856 A1 | 4/2020 | Ouderkirk et al. |
| 2020/0133393 A1 | 4/2020 | Forsland et al. |
| 2020/0138518 A1 | 5/2020 | Lang |
| 2020/0186787 A1 | 6/2020 | Cantero |
| 2020/0192475 A1 | 6/2020 | Gustafsson et al. |
| 2020/0241305 A1 | 7/2020 | Ouderkirk et al. |
| 2020/0241635 A1 | 7/2020 | Cohen |
| 2020/0241650 A1 | 7/2020 | Kramer et al. |
| 2020/0249755 A1 | 8/2020 | Uscinski et al. |
| 2020/0329961 A1 | 10/2020 | Oz et al. |
| 2021/0003848 A1 | 1/2021 | Choi et al. |
| 2021/0003900 A1 | 1/2021 | Chen |
| 2021/0015364 A1 | 1/2021 | Rege et al. |
| 2021/0055555 A1* | 2/2021 | Chi ............... G02B 27/44 |
| 2021/0120222 A1 | 4/2021 | Holz et al. |
| 2021/0278671 A1 | 9/2021 | Hsiao et al. |
| 2021/0278677 A1 | 9/2021 | Ouderkirk et al. |
| 2021/0286183 A1 | 9/2021 | Ouderkirk et al. |
| 2022/0146839 A1 | 5/2022 | Miller |
| 2022/0326513 A1 | 10/2022 | Yeoh et al. |

FOREIGN PATENT DOCUMENTS

| | | |
|---|---|---|
| CN | 102595178 B | 9/2015 |
| CN | 204807808 U | 11/2015 |
| CN | 105208916 A | 12/2015 |
| CN | 105527710 A | 4/2016 |
| CN | 106371218 A | 2/2017 |
| CN | 106537290 A | 3/2017 |
| CN | 106909222 A | 6/2017 |
| CN | 107016685 A | 8/2017 |
| CN | 107347152 A | 11/2017 |
| CN | 107438796 A | 12/2017 |
| CN | 108427498 A | 8/2018 |
| CN | 109073901 A | 12/2018 |
| CN | 109477961 A | 3/2019 |
| CN | 109716244 A | 5/2019 |
| CN | 109886216 A | 6/2019 |
| CN | 110168419 A | 8/2019 |
| CN | 110168427 A | 8/2019 |
| CN | 106054403 B | 1/2020 |
| EP | 3388921 A1 | 10/2018 |

(56) References Cited

FOREIGN PATENT DOCUMENTS

| | | | |
|---|---|---|---|
| JP | H4-501927 A | 4/1992 |
| JP | H08-166556 A | 6/1996 |
| JP | H08-206166 A | 8/1996 |
| JP | H09-105885 A | 4/1997 |
| JP | 2004-527793 A | 9/2004 |
| JP | 2007-121581 A | 5/2007 |
| JP | 2010-117542 A | 5/2010 |
| JP | 2011-13688 A | 1/2011 |
| JP | 2011212430 A | 10/2011 |
| JP | 2011255045 A | 12/2011 |
| JP | 5925389 B2 | 5/2016 |
| JP | 2016-180939 A | 10/2016 |
| JP | 2017-056933 A | 3/2017 |
| JP | 2017049468 A | 3/2017 |
| JP | 2018-508036 A | 3/2018 |
| JP | 2018-512900 A | 5/2018 |
| JP | 2018-132756 A | 8/2018 |
| JP | 2018-137505 A | 8/2018 |
| JP | 2018-533062 A | 11/2018 |
| JP | 2019176974 A | 10/2019 |
| JP | 2020-509790 A | 4/2020 |
| KR | 20120069133 A | 6/2012 |
| KR | 10-2019-0108903 A | 9/2019 |
| TW | 498282 B | 8/2002 |
| TW | 201014571 A | 4/2010 |
| TW | 201310974 A | 3/2013 |
| TW | 201435654 A | 9/2014 |
| TW | I544447 B | 8/2016 |
| TW | 201716827 A | 5/2017 |
| TW | 201728959 A | 8/2017 |
| TW | 201738618 A | 11/2017 |
| TW | 201809214 A | 3/2018 |
| TW | I619967 B | 4/2018 |
| TW | 202016603 A | 5/2020 |
| TW | I692348 B | 5/2020 |
| WO | 00/30528 A1 | 6/2000 |
| WO | 2014057557 A1 | 4/2014 |
| WO | 2016105281 A | 6/2016 |
| WO | 2018/025125 A1 | 2/2018 |
| WO | 2018055618 A1 | 3/2018 |
| WO | 2018/175265 A1 | 9/2018 |
| WO | 2021258078 A1 | 12/2021 |
| WO | 2022072565 A1 | 4/2022 |

OTHER PUBLICATIONS

Office Action issued on Sep. 26, 2023, in corresponding, U.S. Appl. No. 18/017,840.
Taiwanese Office Action, dated Aug. 30, 2023, in a corresponding Taiwanese patent application, No. TW 111104638.
PCT/US2021/038318 International Search Report and Written Opinion issued on Sep. 24, 2021.
PCT/US2021/052750 International Search Report and Written Opinion issued on Dec. 28, 2021.
U.S. Appl. No. 17/179,423 Final Rejection filed Jul. 11, 2022.
U.S. Appl. No. 17/179,423 Non-Final Rejection filed Jan. 21, 2022.
Kim, J et al., "Foveated AR: Dynamically-Foveated Augmented Reality Display" pp. 1-15 [online]. Jul. 12, 2019; ACM Transactions on Graphics vol. 38, Issue 4 [Retrieved on Apr. 9, 2022]. Retrieved from the internet <url: https://dl.acm.org/doi/10.1145/3306346.3322987>; DOI: https://doi.org/10.1145/3306346.3322987.
EP 20886006.4 European Search Report issued on Nov. 21, 2023.
TW 110130182 Office Actioin issued on Dec. 15, 2024.
EP 22750600.3 European Search Report issued on Jan. 30, 2024.
TW 112112456 Office Action issued on Nov. 27, 2023.
EP 21827555.0 European Search Report issued on Aug. 8, 2023.
PCT/US2021/046078 International Search Report and Written Opinion issued on Nov. 24, 2021.
PCT/US2021/046078 International Preliminary Report and Written Opinion issued on Dec. 16, 2022.
PCT/US2021/049171 International Search Report and Written Opinion mailed issued on Dec. 6, 2021.
PCT/US2022/015717 International Search Report and Written Opinion issued on May 23, 2022.
PCT/US2022/033321 International Search Report and Written Opinion issued on Nov. 15, 2022.
TW 109141615 Non-Final Office Action issued on Aug. 23, 2022.
TW 110122655 office action issued on Aug. 14, 2023.
TW 110132945 Non-Final Office Action issued on May 26, 2023.
TW 110136602 Office Action issued on Jun. 14, 2023.
TW 111121911 office action issued on Jan. 16, 2023.
U.S. Appl. No. 17/637,808 Notice of Allowance filed Jul. 13, 2023.
International Search Report and Written Opinion mailed on Feb. 5, 2021 in International Patent Application No. PCT/US2020/059317, filed on Nov. 6, 2020.
International Preliminary Report in the PCT application No. PCT/US2021/038318, dated Jul. 28, 2022.
International Preliminary Report in the PCT application No. PCT/US2021/052750, dated Dec. 6, 2022.
Japanese Office Action, dated Jun. 11, 2024 in a counterpart Japanese patent application, No. JP 2021-563371.
Chinese Office Action, dated Feb. 29, 2024, and Search Report dated Feb. 27, 2024, in a related Chinese patent application, No. CN 202080037323.1.
Chinese Office Action, dated Nov. 29, 2024 in a counterpart Chinese patent application, No. CN 202080037323.1.

* cited by examiner

| Virtual binocular pixel | Pair of right pixel and left pixel | Address pointer |
|---|---|---|
| VBP(1) | RRI(1,1) & LRI(1,1) [R11 & L11] | Memory address 1 |
| VBP(2) | RRI(2,1) & LRI(1,1) [R21 & L11] | Memory address 2 |
| ... | ... | ... |
| VBP(7) | RRI(1,1) & LRI(2,1) [R11 & L21] | Memory address 7 |
| VBP(37) | RRI(1,2) & LRI(1,2) [R12 & L12] | Memory address 37 |
| ... | ... | ... |
| VBP(216) | RRI(6,6) & LRI(6,6) [R66 & L66] | Memory address 216 |

FIG. 5

SYSTEM AND METHOD FOR DISPLAYING AN OBJECT WITH DEPTHS

RELATED APPLICATION

This application claims the benefit of provisional application 62/931,228, filed on Nov. 6, 2019, titled "SYSTEM AND METHOD FOR PROJECTING BINOCULAR 3D IMAGES WITH DEPTHS", provisional application 62/978,322, filed on Feb. 19, 2020, titled "HEAD WEARABLE DEVICE WITH INWARD AND OUTWARD CAMERA", provisional application 63/041,740, filed on Jun. 19, 2020, titled "METHODS AND SYSTEMS FOR EYEBOX EXPANSION", and provisional application 63/085,172, filed on Sep. 30, 2020, titled "SYSTEMS AND METHODS FOR PROJECTING VIRTUAL IMAGES WITH MULTIPLE DEPTHS", and incorporated herein by reference at their entirety.

BACKGROUND OF THE INVENTION

Field of the Invention

The present disclosure relates generally to a method and a system for displaying an object with depths and, in particular, to a method and a system for displaying an object by generating and redirecting multiple right light signals and left light signals respectively to a viewer's retinas.

Description of Related Art

In conventional virtual reality (VR) and augmented reality (AR) systems which implement stereoscopic technology, a three-dimensional virtual image is produced by projecting two parallax images with different view angles concurrently to the left and right display panels that is proximate to the viewer's eyes, respectively. View angle difference between the two parallax images (parallax images) is interpreted by the brain and translated as depth perception, while the viewer's eyes are actually focusing (fixating) on the display panel, which has a different depth perception from that the viewer perceived due to the parallax images. And vergence-accommodation conflict (VAC) occurs when the accommodation for focusing on an object mismatches with the convergence of the eyes based on the depth perception. The VAC causes the viewer to experience dizziness or headache. Moreover, when using parallax images in a mix reality (MR) setting, the user will not be able to focus on real object and virtual image at the same time ("focal rivalry"). Furthermore, displaying motion of virtual images via parallax imaging technology places a heavy burden on graphic hardware.

SUMMARY

An object of the present disclosure is to provide a system and a method for displaying an object with depths in space. Because the depth of the object is the same as the location both eyes of a viewer fixate, vergence-accommodation conflict (VAC) and focal rivalry can be avoided. The object displaying system has a right light signal generator, a right combiner, a left light signal generator, and a left combiner. The right light signal generator generates multiple right light signals for an object. The right combiner receives and redirects the multiple right light signals towards one retina of a viewer to display multiple right pixels of the object. The left light signal generator generates multiple left light signals for the object. The left combiner receives and redirects the multiple left light signals towards the other retina of the viewer to display multiple left pixels of the object. In addition, a first redirected right light signal and a corresponding first redirected left light signal are perceived by the viewer to display a first virtual binocular pixel of the object with a first depth that is related to a first angle between the first redirected right light signal and the corresponding first redirected left light signal. In one embodiment, the first depth is determined by the first angle between light path extensions of the first redirected right light signal and the corresponding first redirected left light signal.

The object is perceived with multiple depths when, in addition to the first virtual binocular pixel of the object, a second redirected right light signal and a corresponding second redirected left light signal are perceived by the viewer to display a second virtual binocular pixel of the object with a second depth that is related to a second angle between the second redirected right light signal and the corresponding second redirected left light signal.

Furthermore, the first redirected right light signal is not a parallax of the corresponding first redirected left light signal. Both the right eye and the left eye receive the image of the object from the same view angle, rather than a parallax respectively from the right eye view angle and left eye view angle, which is conventionally used to generate a 3D image.

In another embodiment, the first redirected right light signal and the corresponding first redirected left light signals are directed to approximately the same height of the retina of the viewer's both eyes.

In another embodiment, the multiple right light signals generated from the right light signal generator are reflected only once before entering the retina of the viewer, and the multiple left light signals generated from the left light signal generator are reflected only once before entering the other retina of the viewer.

In one embodiment, the right combiner receiving and redirecting the multiple right light signals towards a right retina of a viewer to display multiple right pixels of the object and the left combiner receiving and redirecting the multiple left light signals towards a left retina of the viewer to display multiple left pixels of the object. In another embodiment, the right combiner receiving and redirecting the multiple left light signals towards a right retina of a viewer to display multiple right pixels of the object and the left combiner receiving and redirecting the multiple right light signals towards a left retina of the viewer to display multiple left pixels of the object.

In an application of augmented reality (AR) or mixed reality (MR), the right combiner and the left combiner are transparent for ambient lights.

Also in the application of AR and MR, an object displaying system further includes a support structure that is wearable on a head of the viewer. The right light signal generator, the left light signal generator, the right combiner, and the left combiner are carried by the support structure. In one embodiment, the system is a head wearable device, in particular a pair of glasses. In this circumstance, the support structure may be a frame with or without lenses of the pair of glasses. The lenses may be prescription lenses used to correct nearsightedness, farsightedness, etc.

In the embodiment of smart glasses, the right light signal generator may be carried by the right temple of the frame and the left light signal generator may be carried by the left temple of the frame. In addition, the right combiner may be carried by the right lens and the left combiner may be carried by the left lens. The carrying can be implemented in various manner. The combiner may be attached or incorporated to the lens by either a removable or a non-removable means. In addition, the combiner may be integratedly made with the lens, including prescription lens.

The present invention uses retinal scanning to project right light signals and left light signals to the viewer's retina, instead of near-eye display usually placed in close proximity to the viewer's eyes, for displaying virtual images.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

FIG. 5 is a table illustrating an embodiment of a look up table in accordance with the present invention.

DETAILED DESCRIPTION OF PREFERRED EMBODIMENTS

Figure 1:
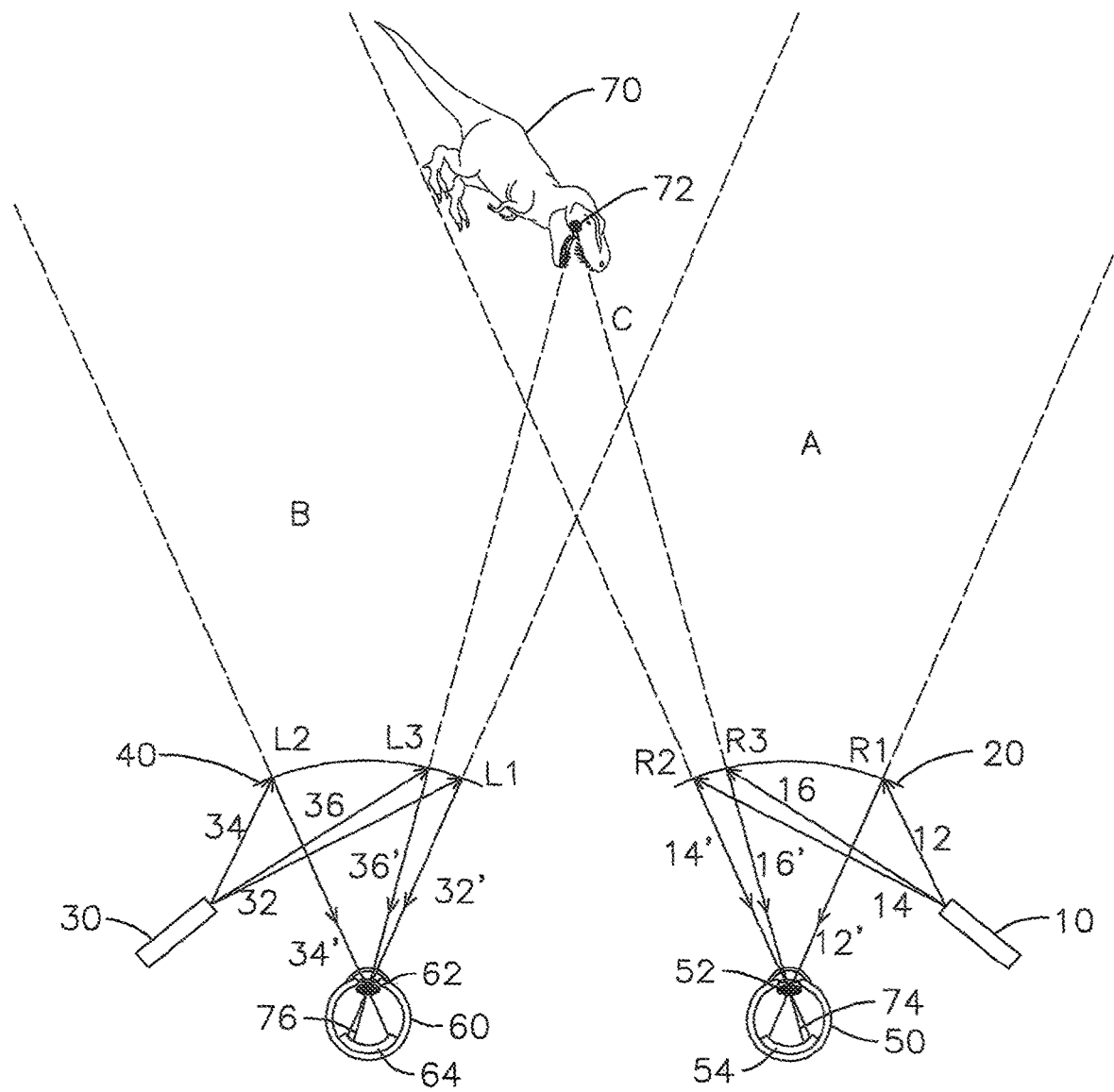
FIG. 1 is a schematic diagram illustrating an embodiment of an object displaying system in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The present invention relates to systems and methods for displaying an object with a depth in space. Because the depth of the object is the same as the location both eyes of a viewer fixate, vergence-accommodation conflict (VAC) and focal rivalry can be avoided. The described embodiments concern one or more methods, systems, apparatuses, and computer readable mediums storing processor-executable process steps to display an object with depths in space for a viewer. An object displaying system has a right light signal generator, a right combiner, a left light signal generator, and a left combiner. The right light signal generator generates multiple right light signals for an object. The right combiner receives and redirects the multiple right light signals towards one retina of a viewer to display multiple right pixels of the object. The left light signal generator generates multiple left light signals for the object. The left combiner receives and redirects the multiple left light signals towards the other retina of the viewer to display multiple left pixels of the object. In addition, a first redirected right light signal and a corresponding first redirected left light signal are perceived by the viewer to display a first virtual binocular pixel of the object with a first depth that is related to a first angle between the first redirected right light signal and the corresponding first redirected left light signal. In one embodiment, the first depth is determined by the first angle between light path extensions of the first redirected right light signal and the corresponding first redirected left light signal.

The object is perceived with multiple depths when, in addition to the first virtual binocular pixel of the object, a second redirected right light signal and a corresponding second redirected left light signal are perceived by the viewer to display a second virtual binocular pixel of the object with a second depth that is related to a second angle between the second redirected right light signal and the corresponding second redirected left light signal.

Furthermore, the first redirected right light signal is not a parallax of the corresponding first redirected left light signal. Both the right eye and the left eye receive the image of the object from the same view angle, rather than a parallax respectively from the right eye view angle and left eye view angle, which is conventionally used to generate a 3D image.

In another embodiment, the first redirected right light signal and the corresponding first redirected left light signals are directed to approximately the same height of the retina of the viewer's both eyes.

In another embodiment, the multiple right light signals generated from the right light signal generator are reflected only once before entering the retina of the viewer, and the multiple left light signals generated from the left light signal generator are reflected only once before entering the other retina of the viewer.

In one embodiment, the right combiner receiving and redirecting the multiple right light signals towards a right retina of a viewer to display multiple right pixels of the object and the left combiner receiving and redirecting the multiple left light signals towards a left retina of the viewer to display multiple left pixels of the object. In another embodiment, the right combiner receiving and redirecting the multiple left light signals towards a right retina of a viewer to display multiple right pixels of the object and the left combiner receiving and redirecting the multiple right light signals towards a left retina of the viewer to display multiple left pixels of the object.

In an application of augmented reality (AR) or mixed reality (MR), the right combiner and the left combiner are transparent for ambient lights.

Also in the application of AR and MR, an object displaying system further includes a support structure that is wearable on a head of the viewer. The right light signal generator, the left light signal generator, the right combiner, and the left combiner are carried by the support structure. In one embodiment, the system is a head wearable device, in particular a pair of glasses. In this circumstance, the support structure may be a frame with or without lenses of the pair of glasses. The lenses may be prescription lenses used to correct nearsightedness, farsightedness, etc.

In the embodiment of smart glasses, the right light signal generator may be carried by the right temple of the frame and the left light signal generator may be carried by the left temple of the frame. In addition, the right combiner may be carried by the right lens and the left combiner may be carried by the left lens. The carrying can be implemented in various manner. The combiner may be attached or incorporated to the lens by either a removable or a non-removable means. In addition, the combiner may be integratedly made with the lens, including prescription lens.

As shown in FIG. 1, an object displaying system includes a right light signal generator 10 to generate multiple right light signals (RLS) such as 12 for RLS_1, 14 for RLS_2 and 16 for RLS_3, a right combiner 20 to receive and redirect the multiple right light signals 12', 14', and 16' towards the right retina 54 of a viewer, a left light signal generator 30 to generate multiple left light signals (LLS) such as 32 for LLS_1, 34 for LLS_2, and 36 for LLS_3, and a left combiner 40 to receive and redirect the multiple left light signals 32', 34', and 36' towards a left retina 64 of the viewer. The viewer has a right eye 50 containing a right pupil 52 and a right retina 54, and a left eye 60 containing a left pupil 62 and a left retina 64. The diameter of a human's pupil generally may range from 2 to 8 mm in part depending on the environmental lights. The normal pupil size in adults varies from 2 to 4 mm in diameter in bright light and from 4 to 8 mm in dark. The multiple right light signals are redirected by the right combiner 20, pass the right pupil 52, and are eventually received by the right retina 54. The right light signal RLS_1 is the light signal farthest to the right the viewer's right eye 50 can see on a specific horizontal plan. The right light signal RLS_2 is the light signal farthest to the left the viewer's right eye 50 can see on the same horizontal plane. Upon receipt of the redirected right light signals, the viewer would perceive multiple right pixels for the object in the area A bounded by the extensions of the redirected right light signals RLS_1 and RLS_2. The area A is referred to as the field of view (FOV) for the right eye 50. Likewise, the multiple left light signals are redirected by the left combiner 40, pass the center of the left pupil 62, and are eventually received by the left retina 64. The left light signal LLS_1 is the light signal farthest to the right the viewer's left eye 60 can see on the specific horizontal plan. The left light signal LLS_2 is the light signal farthest to the left the viewer's left eye can see on the same horizontal plane. Upon receipt of the redirected left light signals, the viewer would perceive multiple left pixels for the object in the area B bounded by the extensions of the redirected left light signals LLS_1 and LLS_2. The area B is referred to as the field of view (FOV) for the left eye 60. When both multiple right pixels and left pixels are displayed in the area C which are overlapped by area A and area B, at least one right light signal displaying one right pixel and a corresponding left light signal displaying one left pixel are fused to display a virtual binocular pixel with a specific depth in the area C. The depth is related to an angle of the redirected right light signal and the redirected left light signal. Such angle is also referred to as a convergence angle.

Figure 2:
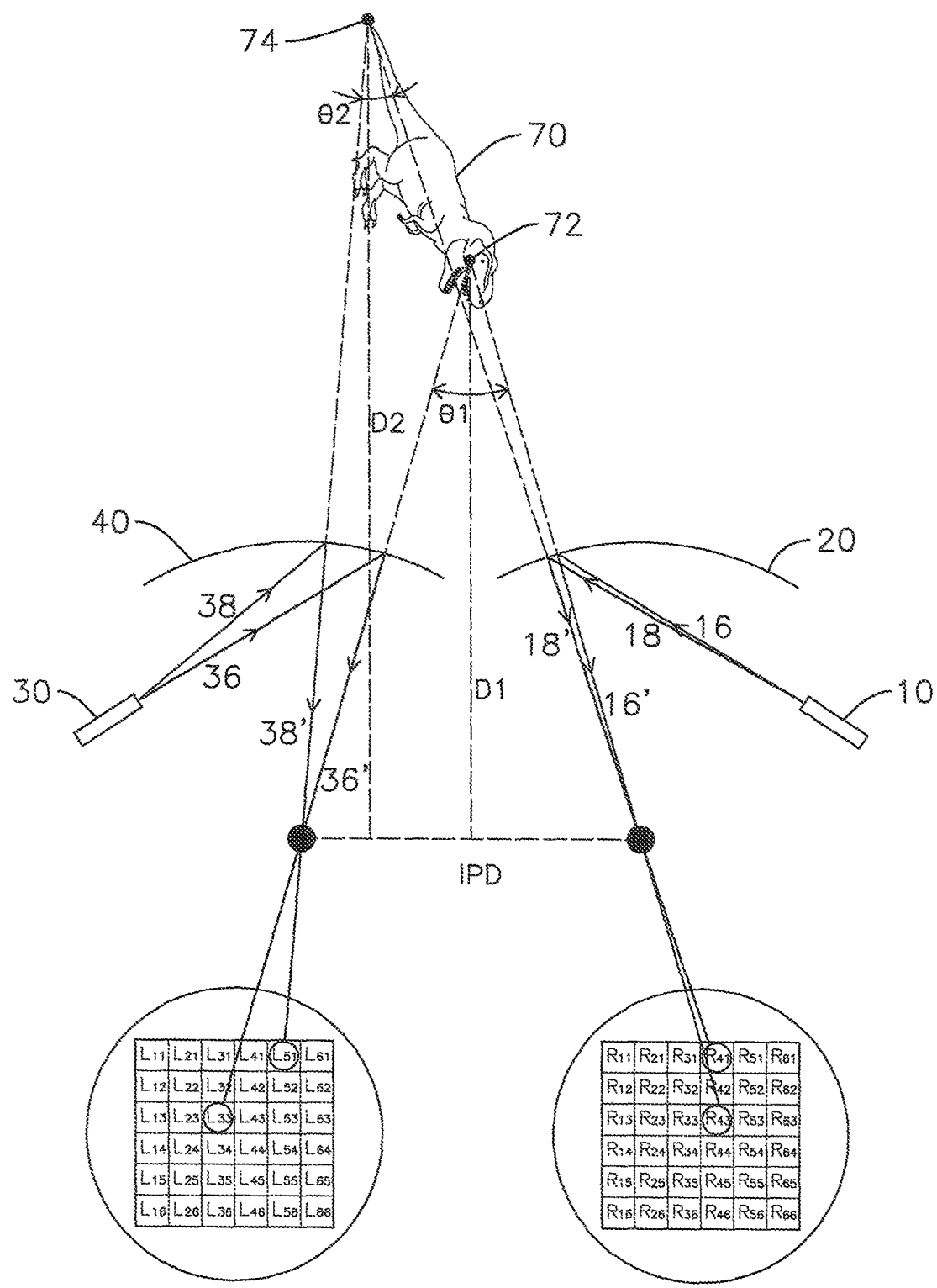
FIG. 2 is a schematic diagram illustrating a relationship between a virtual binocular pixel and the corresponding pair of the right pixel and left pixel in accordance with the present invention.

As shown in FIGS. 1 and 2, the viewer perceives a virtual image of the dinosaur object 70 with multiple depths in the area C in front of the viewer. The image of the dinosaur object 70 includes a first virtual binocular pixel 72 displayed at a first depth D1 and a second virtual binocular pixel 74 displayed at a second depth D2. The first angle between the first redirected right light signal 16' and the corresponding first redirected left light signal 36' is θ1. The first depth D1 is related to the first angle θ1. In particular, the first depth of the first virtual binocular pixel of the object can be determined by the first angle θ1 between the light path extensions of the first redirected right light signal and the corresponding first redirected left light signal. As a result, the first depth D1 of the first virtual binocular pixel 72 can be calculated approximately by the following formula:

$$\operatorname{Tan}\left(\frac{\theta}{2}\right) = \frac{IPD}{2D}$$

The distance between the right pupil 52 and the left pupil 62 is interpupillary distance (IPD). Similarly, the second angle between the second redirected right light signal 18' and the corresponding second redirected left light signal 38' is θ2. The second depth D2 is related to the second angle θ2. In particular, the second depth D2 of the second virtual binocular pixel of the object can be determined approximately by the second angle θ2 between the light path extensions of the second redirected right light signal and the corresponding second redirected left light signal by the same formula. Since the second virtual binocular pixel 74 is perceived by the viewer to be further away from the viewer (i.e. with larger depth) than the first virtual binocular pixel 72, the second angle θ2 is smaller than the first angle θ1.

Furthermore, although the redirected right light signal 16' for RLS_3 and the corresponding redirected left light signal 36' for LLS_2 together display a first virtual binocular pixel 72 with the first depth D1, the redirected right light signal 16' for RLG_3 is not a parallax of the corresponding redirected left light signal 36' for LLS_3. Conventionally, a parallax between the image received by the right eye and the image received by the left eye is used for a viewer to perceive a 3D image with depth because the right eye sees the same object from a view angle different from that of a left eye. However, in the present invention, the right light signal and the corresponding left light signal for a virtual binocular pixel display an image of the same view angle. Thus, the intensity of red, blue, and green (RBG) color and/or the brightness of the right light signal and the left light signal are approximately the same. In other words, the right pixel and the corresponding left pixel are approximately the same. However, in another embodiment, one or both of the right light signal and the left light signal may be modified to present some 3D effects such as shadow. In general, both the right eye and the left eye receive the image of the object from the same view angle in the present invention, rather than a parallax respectively from the right eye view angle and left eye view angle, conventionally used to generate a 3D image.

As described above, the multiple right light signals are generated by the right light signal generator, redirected by the right combiner, and then directly scanned onto the right retina to form a right retina image on the right retina. Likewise, the multiple left light signals are generated by left light signal generator, redirected by the left combiner, and then scanned onto the left retina to form a left retina image on the left retina. In an embodiment shown in FIG. 2, a right retina image 80 contains 36 right pixels in a 6×6 array and a left retina image 90 also contains 36 left pixels in a 6×6 array. In another embodiment, a right retina image 80 contains 921,600 right pixels in a 1280×720 array and a left retina image 90 also contains 921,600 left pixels in a 1280×720 array. The object displaying system is configured to generate multiple right light signals and corresponding multiple left light signals which respectively form the right retina image on the right retina and left retina image on the left retina. As a result, the viewer perceives a virtual binocular object with specific depths in the area C because of image fusion.

With reference to FIG. 2, the first right light signal 16 from the right light signal generator 10 is received and reflected by the right combiner 20. The first redirected right light signal 16', through the right pupil 52, arrives the right retina of the viewer to display the right pixel R34. The corresponding left light signal 36 from the left light signal generator 30 is received and reflected by the left combiner 40. The first redirected light signal 36', through the left pupil 62, arrives the left retina of the viewer to display the left retina pixel L33. As a result of image fusion, a viewer perceives the virtual binocular object with multiple depths where the depths are determined by the angles of the multiple redirected right light signals and the corresponding multiple redirected left light signals for the same object. The angle between a redirected right light signal and a corresponding left light signal is determined by the relative horizontal distance of the right pixel and the left pixel. Thus, the depth of a virtual binocular pixel is inversely correlated to the relative horizontal distance between the right pixel and the corresponding left pixel forming the virtual binocular pixel. In other words, the deeper a virtual binocular pixel is perceived by the viewer, the smaller the relative horizontal distance at X axis between the right pixel and left pixel forming such a virtual binocular pixel is. For example, as shown in FIG. 2, the second virtual binocular pixel 74 is perceived by the viewer to have a larger depth (i.e. further away from the viewer) than the first virtual binocular pixel 72. Thus, the horizontal distance between the second right pixel and the second left pixel is smaller than the horizontal distance between the first right pixel and the first left pixel on the retina images. Specifically, the horizontal distance between the second right pixel R41 and the second left pixel L51 forming the second virtual binocular pixel is four-pixel long. However, the distance between the first right pixel R43 and the first left pixel L33 forming the first virtual binocular pixel is six-pixel long.

Figure 3:
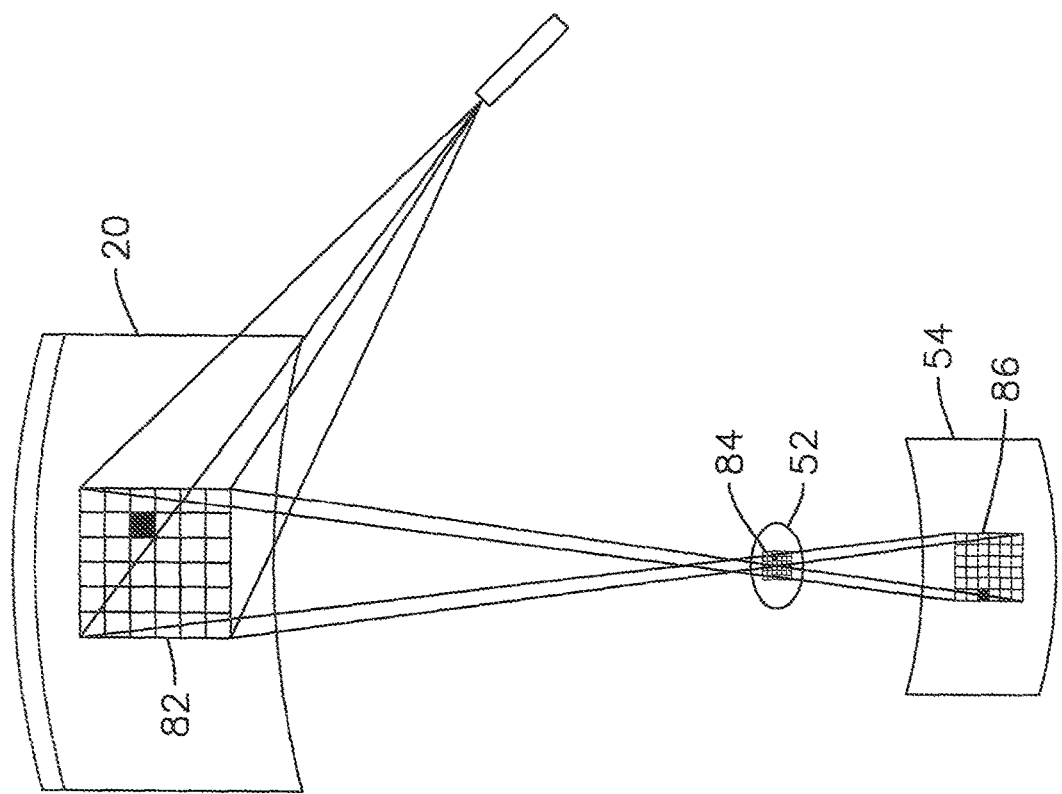
FIG. 3 is a schematic diagram illustrating the light path from a light signal generator to a combiner, and to a retina of a viewer in accordance with the present invention.
Figure 3:
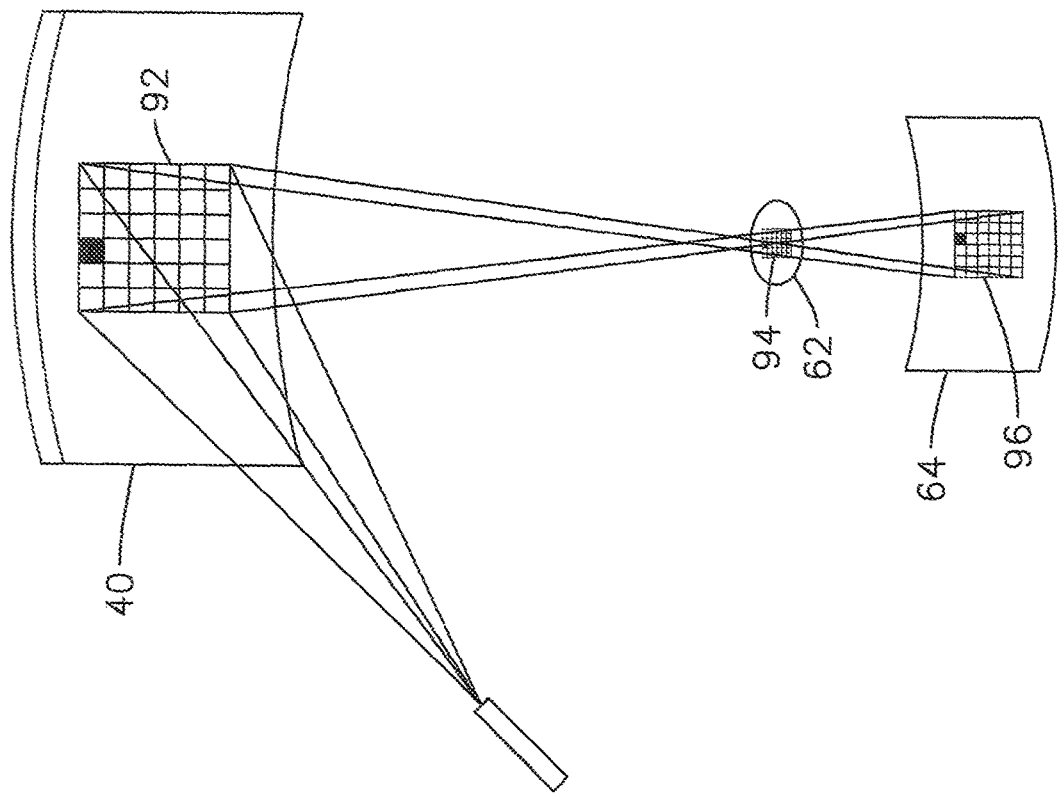

In one embodiment shown in FIG. 3, the light paths of multiple right light signals and multiple left light signals from a light signal generator to a retina are illustrated. The multiple right light signals generated from the right light generator are projected onto the right combiner 20 to form a right combiner image (RCI) 82. These multiple right light signals are redirected by the right combiner 20 and converge into a small right pupil image (RPI) 84 to pass through the right pupil 52, and then eventually arrive the right retina 54 to form a right retina image (RRI) 86. Each of the RCI, RPI, and RRI comprises i×j pixels. Each right light signal RLS (i,j) travels through the same corresponding pixels from RCI(i,j), to RPI(i,j), and then to RRI(x,y). For example RLS(5,3) travels from RCI(5,3), to RPI(5,3) and then to RRI(2,4). Likewise, the multiple left light signals generated from the left light generator 30 are projected onto the left combiner 40 to form a left combiner image (LCI) 92. These multiple left light signals are redirected by the left combiner 40 and converge into a small left pupil image (LPI) 94 to pass through the left pupil 62, and then eventually arrive the left retina 64 to form a right retina image (LRI) 96. Each of the LCI, LPI, and LRI comprises i×j pixels. Each left light signal LLS(i,j) travels through the same corresponding pixels from LCI(i,j), to LPI(i,j), and then to LRI(x,y). For example LLS(3,1) travels from LCI(3,1), to LPI(3,1) and then to LRI(4,6). The (0, 0) pixel is the top and left most pixel of each image. Pixels in the retina image is left-right inverted and top-bottom inverted to the corresponding pixels in the combiner image. Based on appropriate arrangements of the relative positions and angles of the light signal generators and combiners, each light signal has its own light path from a light signal generator to a retina. The combination of one right light signal displaying one right pixel on the right retina and one corresponding left light signal displaying one left pixel on the left retina forms a virtual binocular pixel with a specific depth perceived by a viewer. Thus, a virtual binocular pixel in the space can be represented by a pair of right pixel and left pixel or a pair of right combiner pixel and left combiner pixel.

A virtual object perceived by a viewer in area C includes multiple virtual binocular pixels. To precisely describe the location of a virtual binocular pixel in the space, each location in the space is provided a three dimensional (3D) coordinate, for example XYZ coordinate. Other 3D coordinate system can be used in another embodiment. As a result, each virtual binocular pixel has a 3D coordinate—a horizontal direction, a vertical direction, and a depth direction. A horizontal direction (or X axis direction) is along the direction of interpupillary line. A vertical direction (or Y axis direction) is along the facial midline and perpendicular to the horizontal direction. A depth direction (or Z axis direction) is normal to the frontal plane and perpendicular to both the horizontal and vertical directions.

Figure 4:
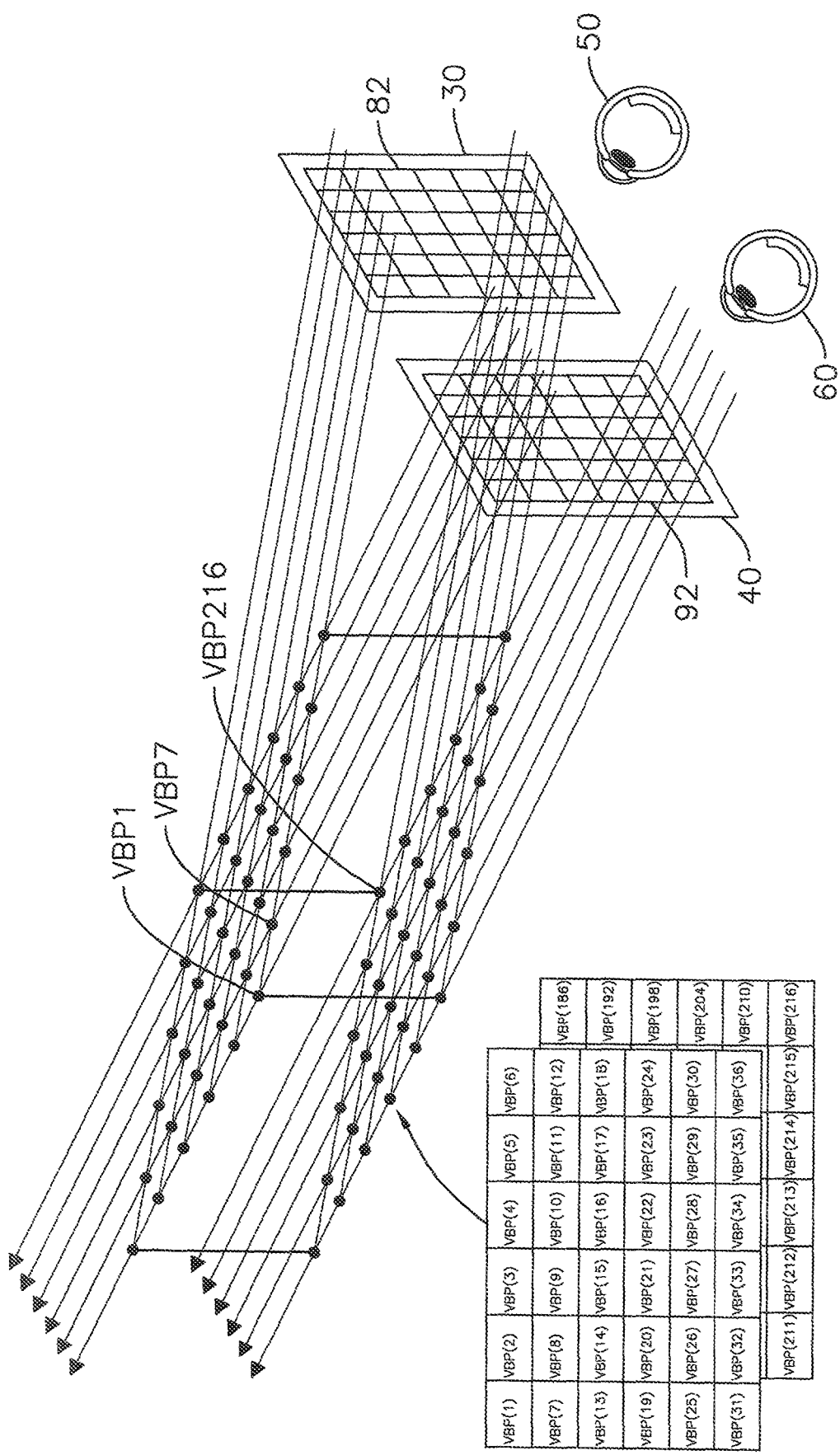
FIG. 4 is a schematic diagram illustrating the virtual binocular pixels formed by right light signals and left light signals in accordance with the present invention.

FIG. 4 illustrates the relationship between pixels in the right combiner image, pixels in the left combiner image, and the virtual binocular pixels. As described above, pixels in the right combiner image are one to one correspondence to pixels in the right retina image (right pixels). Pixels in the left combiner image are one to one correspondence to pixels in the left retina image (left pixels). However, pixels in the retina image is left-right inverted and top-bottom inverted to the corresponding pixels in the combiner image. For a right retina image comprising 36 (6×6) right pixels and a left retina image comprising 36 (6×6) right pixels, there are 216 (6×6×6) virtual binocular pixels (shown as a dot) in the area C assuming all light signals are within FOV of both eyes of the viewer. The light path extension of one redirected right light signal intersects the light path extension of each redirected left light signal on the same row of the image. Likewise, the light path extension of one redirected left light signal intersects the light path extension of each redirected right light signal on the same row of the image. Thus, there are 36 (6×6) virtual binocular pixels on one layer and 6 layers in the space. There is usually a small angle between two adjacent lines representing light path extensions to intersect and form virtual binocular pixels although they are shown as parallel lines in the FIG. 4. A right pixel and a corresponding left pixel at approximately the same height of each retina (i.e. the same row of the right retina image and left retina image) tend to fuse earlier. As a result, right pixels are paired with left pixels at the same row of the retina image to form virtual binocular pixels.

As shown in FIG. 5, a look-up table is created to facilitate identifying the right pixel and left pixel pair for each virtual binocular pixel. For example, 216 virtual binocular pixels, numbering from 1 to 216, are formed by 36 (6×6) right pixels and 36 (6×6) left pixels. The first ($1^{st}$) virtual binocular pixel VBP(1) represents the pair of right pixel RRI (1,1) and left pixel LRI(1,1). The second ($2^{nd}$) virtual binocular pixel VBP(2) represents the pair of right pixel RRI(2,1) and left pixel LRI(1,1). The seventh ($7^{th}$) virtual binocular pixel VBP(7) represents the pair of right pixel RRI(1,1) and left pixel LRI(2,1). The thirty-seventh ($37^{th}$) virtual binocular pixel VBP(37) represents the pair of right pixel RRI(1,2) and left pixel LRI(1,2). The two hundred and sixteenth ($216^{th}$) virtual binocular pixel VBP(216) represents the pair of right pixel RRI(6,6) and left pixel LRI(6,6). Thus, in order to display a specific virtual binocular pixel of an object in the space for the viewer, it is determined which pair of the right pixel and left pixel can be used for generating the corresponding right light signal and left light signal. In addition, each row of a virtual binocular pixel on the look-up table includes a pointer which leads to a memory address that stores the perceived depth (z) of the VBP and the perceived position (x,y) of the VBP. Additional information, such as scale of size, number of overlapping objects, and depth in sequence depth etc., can also be stored for the VBP. Scale of size may be the relative size information of a specific VBP compared against a standard VBP. For example, the scale of size may be set to be 1 when an object is displayed at a standard VBP that is 1 m in front of the viewer. As a result, the scale of size may be set to be 1.2 for a specific VBP that is 90 cm in front of the viewer. Likewise, when the scale of size may be set to be 0.8 for a specific VBP that is 1.5 m in front of the viewer. The scale of size can be used to determine the size of the object for displaying when the object is moved from a first depth to a second depth. The number of overlapping objects is the number of objects that are overlapped with one another so that one object is completely or partially hidden behind another object. The depth in sequence provides information about sequence of depths of various overlapping objects. For example, 3 objects overlapping with each other. The depth in sequence of the first object in the front may be set to be 1 and the depth in sequence of the second object hidden behind the first object may be set to be 2. The number of overlapping objects and the depth in sequence may be used to determine which and what portion of the objects need to be displayed when various overlapping objects are in moving.

Figure 6:
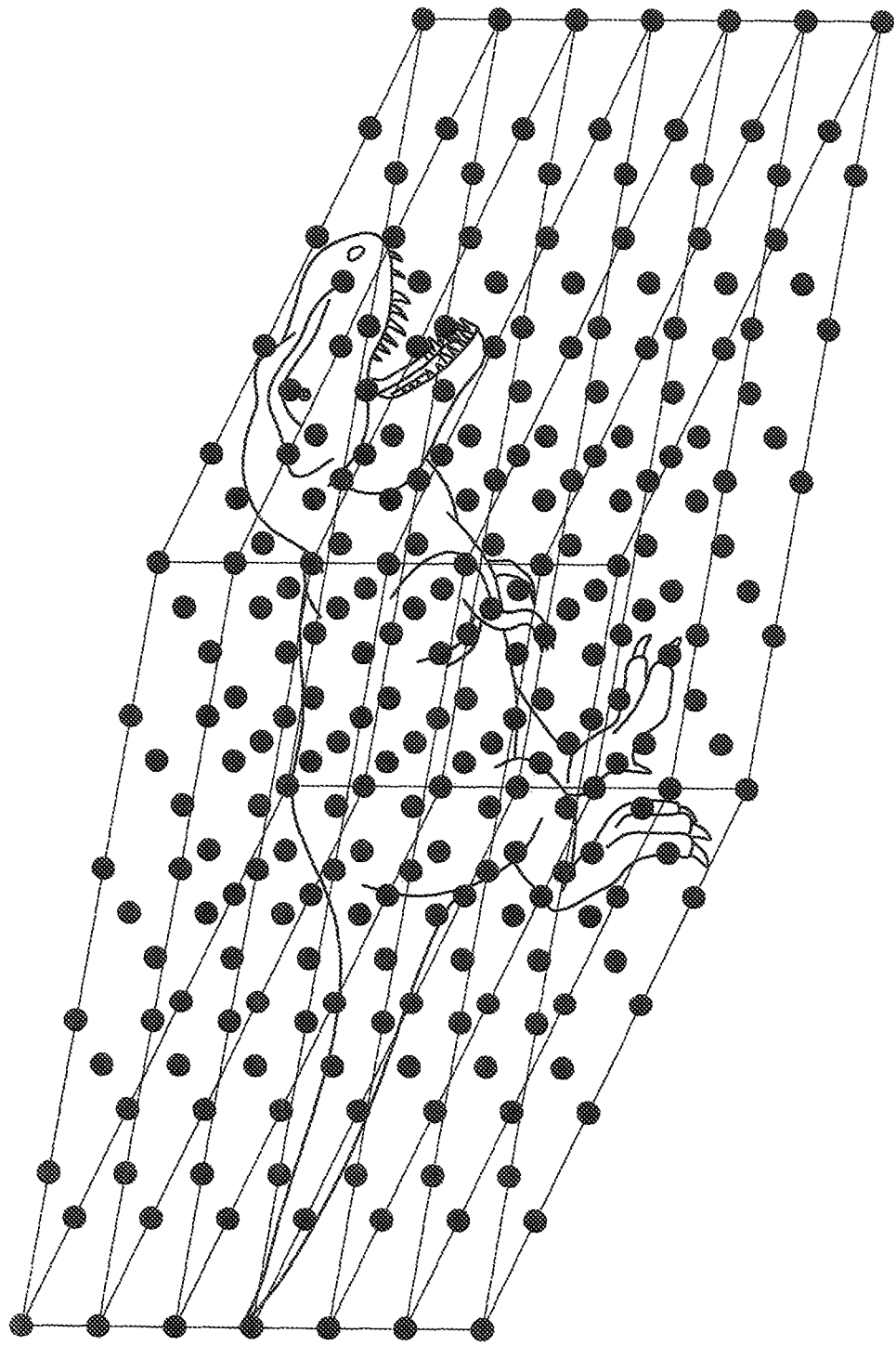
FIG. 6 is a schematic diagram illustrating displaying an object by various virtual binocular pixels in accordance with the present invention.
Figure 7:
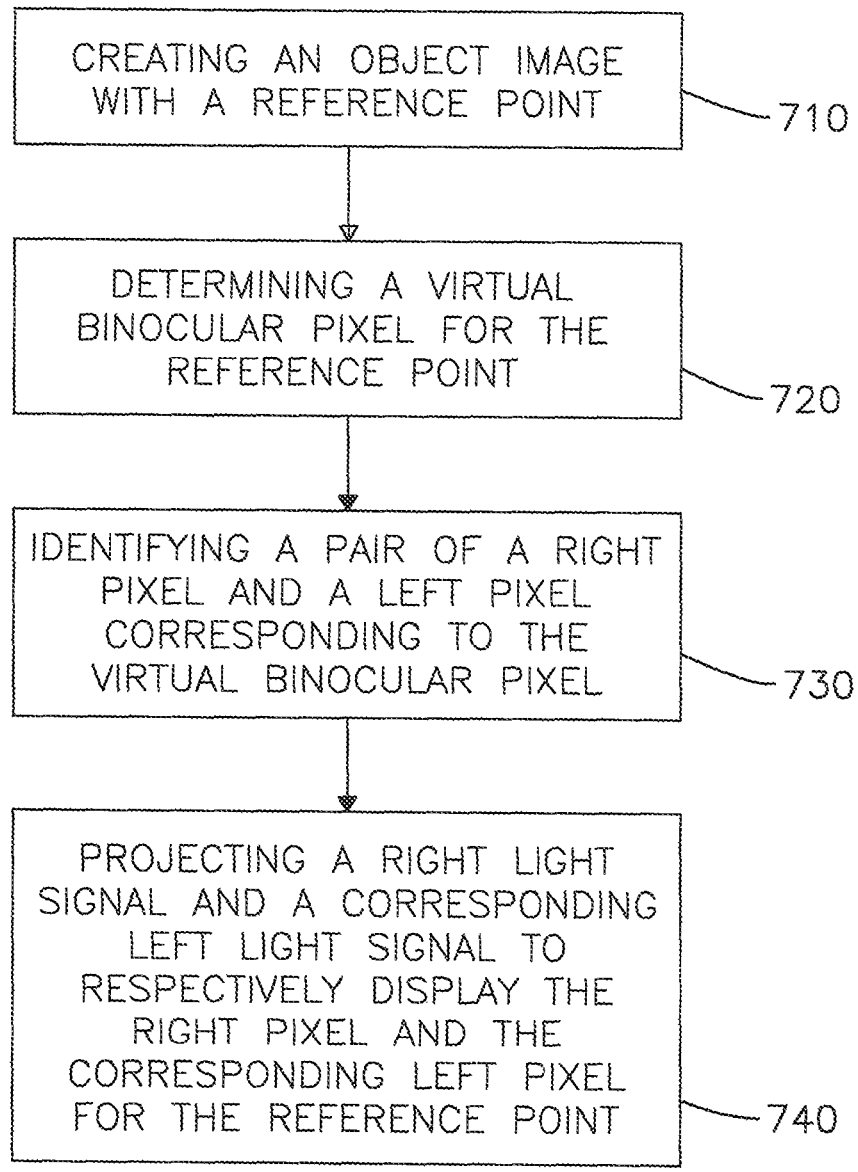
FIG. 7 is a flow chart illustrating an embodiment of processes for displaying an object in accordance with the present invention.

As shown in FIG. 6, a virtual object with multiple depths, such as a dinosaur, can be displayed in the area C for a viewer by projecting the predetermined right pixels and left pixels onto the retinas of the viewer's eyes. In one embodiment, the location of the object is determined by a reference point and the view angle of the object is determined by a rotation angle. As shown in FIG. 7, at step 710, create an object image with a reference point. In one embodiment, the object image may be created by 2D or 3D modeling. The reference point may be the center of gravity of the object. At step 720, determine a virtual binocular pixel for the reference point. With a 3D coordinate of the reference point, a designer can directly determine, for example via a software GUI, a closest virtual binocular pixel by its number, such as VBP(145). At step 730, identify a pair of right pixel and left pixel corresponding to the virtual binocular pixel. A designer can then use the look-up table to identify the corresponding pair of the right pixel and left pixel. A designer can also use the predetermined depth of the reference point to calculate the convergent angle and then identify the corresponding right pixel and left pixel, assuming the reference point is before the middle of viewer's both eyes. The designer can move the reference point on XY plane to the predetermined X and Y coordinates and then identify the final corresponding right pixel and left pixel. At step 740, project a right light signal and a corresponding left light signal to respectively display the right pixel and the corresponding left pixel for the reference. Once the pair of the right pixel and the left pixel corresponding to the virtual binocular pixel for the reference point is determined, the whole virtual object can be displayed using its 2D or 3D modeling information.

The look up table may be created by the following processes. At the first step, obtain an individual virtual map based on his/her IPD, created by the system during initiation or calibration, which specify the boundary of the area C where the viewer can perceive an object with depths because of the fusion of right retina image and left retina image. At the second step, for each depth at Z axis direction (each point at Z-coordinate), calculate the convergence angle to identify the pair of right pixel and left pixel respectively on the right retina image and the left retina image regardless of the X-coordinate and Y-coordinate location. At the third step, move the pair of right pixel and left pixel along X axis direction to identify the X-coordinate and Z-coordinate of each pair of right pixel and left pixel at a specific depth regardless of the Y-coordinate location. At the fourth step, move the pair of right pixel and left pixel along Y axis direction to determine the Y-coordinate of each pair of right pixel and left pixel. As a result, the 3D coordinate system such as XYZ of each pair of right pixel and left pixel respectively on the right retina image and the left retina image can be determined to create the look up table. In addition, the third step and the fourth step are exchangeable.

In another embodiment, a designer may determine each of all the necessary virtual binocular pixels to form the virtual object, and then use look-up table to identify each corresponding pair of the right pixel and the left pixel. The right light signals and the left light signals can then be generated accordingly. The right retina image and the left retina image are of the same view angle. Parallax is not used to present 3D images. As a result, very complicated and time-consuming graphics computation can be avoided. The relative location of the object on the right retina image and the left retina image determines the depth perceived by the viewer.

The light signal generator 10 and 30 may use laser, light emitting diode ("LED") including mini and micro LED, organic light emitting diode ("OLED"), or superluminescent diode ("SLD"), LCOS (Liquid Crystal on Silicon), liquid crystal display ("LCD"), or any combination thereof as its light source. In one embodiment, the light signal generator 10 and 30 is a laser beam scanning projector (LBS projector) which may comprise the light source including a red color light laser, a green color light laser, and a blue color light laser, a light color modifier, such as Dichroic combiner and Polarizing combiner, and a two dimensional (2D) adjustable reflector, such as a 2D electromechanical system ("MEMS") mirror. The 2D adjustable reflector can be replaced by two one dimensional (1D) reflector, such as two 1D MEMS mirror. The LBS projector sequentially generates and scans light signals one by one to form a 2D image at a predetermined resolution, for example 1280×720 pixels per frame. Thus, one light signal for one pixel is generated and projected at a time towards the combiner 20 and 40. For a viewer to see such a 2D image from one eye, the LBS projector has to sequentially generate light signals for each pixel, for example 1280×720 light signals, within the time period of persistence of vision, for example 1/18 second. Thus, the time duration of each light signal is about 60.28 nanosecond.

In another embodiment, the light signal generator 10 and 30 may be a digital light processing projector ("DLP projector") which can generate a 2D color image at one time. Texas Instrument's DLP technology is one of several technologies that can be used to manufacture the DLP projector. The whole 2D color image frame, which for example may comprise 1280×720 pixels, is simultaneously projected towards the combiner 20 and 40.

The combiner 20, 40 receives and redirects multiple light signals generated by the light signal generator 10, 30. In one embodiment, the combiner 20, 40 reflects the multiple light signals so that the redirected light signals are on the same side of the combiner 20, 40 as the incident light signals. In another embodiment, the combiner 20, 40 refracts the multiple light signals so that the redirected light signals are on the different side of the combiner 20, 40 from the incident light signals. When the combiner 20, 40 functions as a refractor. The reflection ratio can vary widely, such as 20%-80%, in part depending on the power of the light signal generator. People with ordinary skill in the art know how to determine the appropriate reflection ratio based on characteristics of the light signal generators and the combiners. Besides, in one embodiment, the combiner 20, 40 is optically transparent to the ambient (environmental) lights from the opposite side of the incident light signals. The degree of transparency can vary widely depending on the application. For AR/MR application, the transparency is preferred to be more than 50%, such as about 75% in one embodiment. In addition to redirecting the light signals, the combiner 20, 40 may converge the multiple light signals forming the combiner images so that they can pass through the pupils and arrive the retinas of the viewer's both eyes.

The combiner 20, 40 may be made of glasses or plastic materials like lens, coated with certain materials such as metals to make it partially transparent and partially reflective. One advantage of using a reflective combiner instead of a wave guide in the prior art for directing light signals to the viewer's eyes is to eliminate the problem of undesirable diffraction effects, such as multiple shadows, color displacement . . . etc. The combiner 20, 40 may be a holographic combiner but not preferred because the diffraction effects can cause multiple shadows and RGB displacement. In some embodiments, we may want to avoid using holographic combiner.

Figure 8:
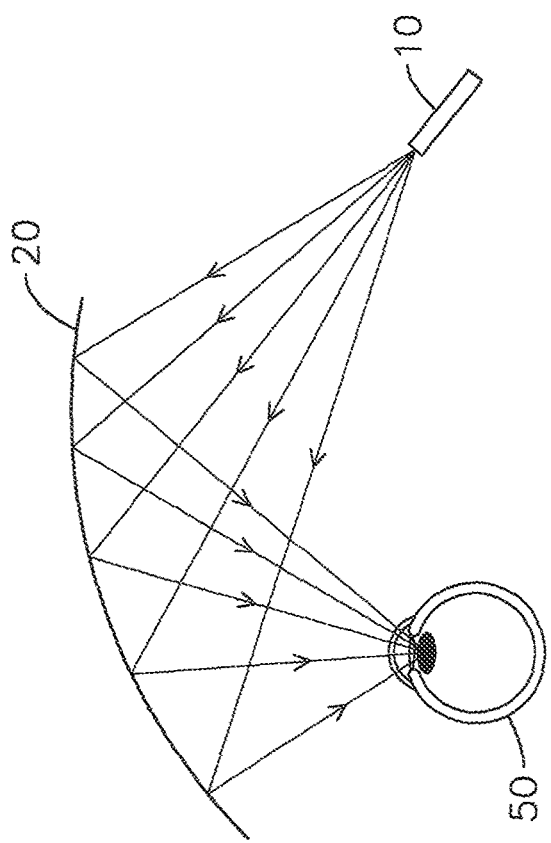
FIG. 8 is a schematic diagram illustrating the position of a light signal generator with respect to the combiner in accordance with the present invention.
Figure 8:
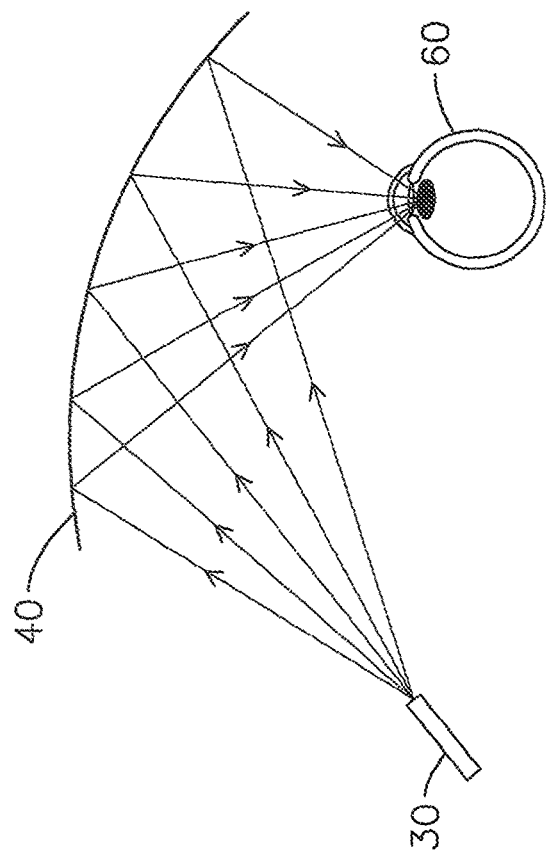

In one embodiment, the combiner 20, 40 is configured to have an ellipsoid surface. In addition, the light signal generator and a viewer's eye are respectively positioned on both focal points of the ellipsoid. As illustrated in FIG. 8, for the right combiner with an ellipsoid surface, the right light signal generator is positioned at the right focal point and the right eye of the viewer is positioned at the left focal point of the ellipsoid. Similarly, for the left combiner with an ellipsoid surface, the left light signal generator is positioned at the left focal point and the left eye of the viewer is positioned at the right focal point of the ellipsoid. Due to the geometric property of the ellipsoid, all the light beams projected from one focal point to the surface of the ellipsoid will be reflected to the other focal point. In this case, all the light beams projected from the light signal generators to the surface of the ellipsoid shaped combiners will be reflected to the eyes of the viewer. Thus, in this embodiment, the FOV can be extended to maximum, as large as the surface of the ellipsoid allows. In another embodiment, the combiner 20, 40 may have a flat surface with a holographic film designed to reflect light in a manner similar to the ellipsoid.

The object displaying system may further include a right collimator and a left collimator to narrow the light beam of the multiple light signals, for example to cause the directions of motion to become more aligned in a specific direction or to cause spatial cross section of the light beam to become smaller. The right collimator may be positioned between the right light signal generator and the right combiner and the left collimator may be positioned between the left light signal generator and the left combiner. The collimator may be a curved minor or lens.

Figure 9:
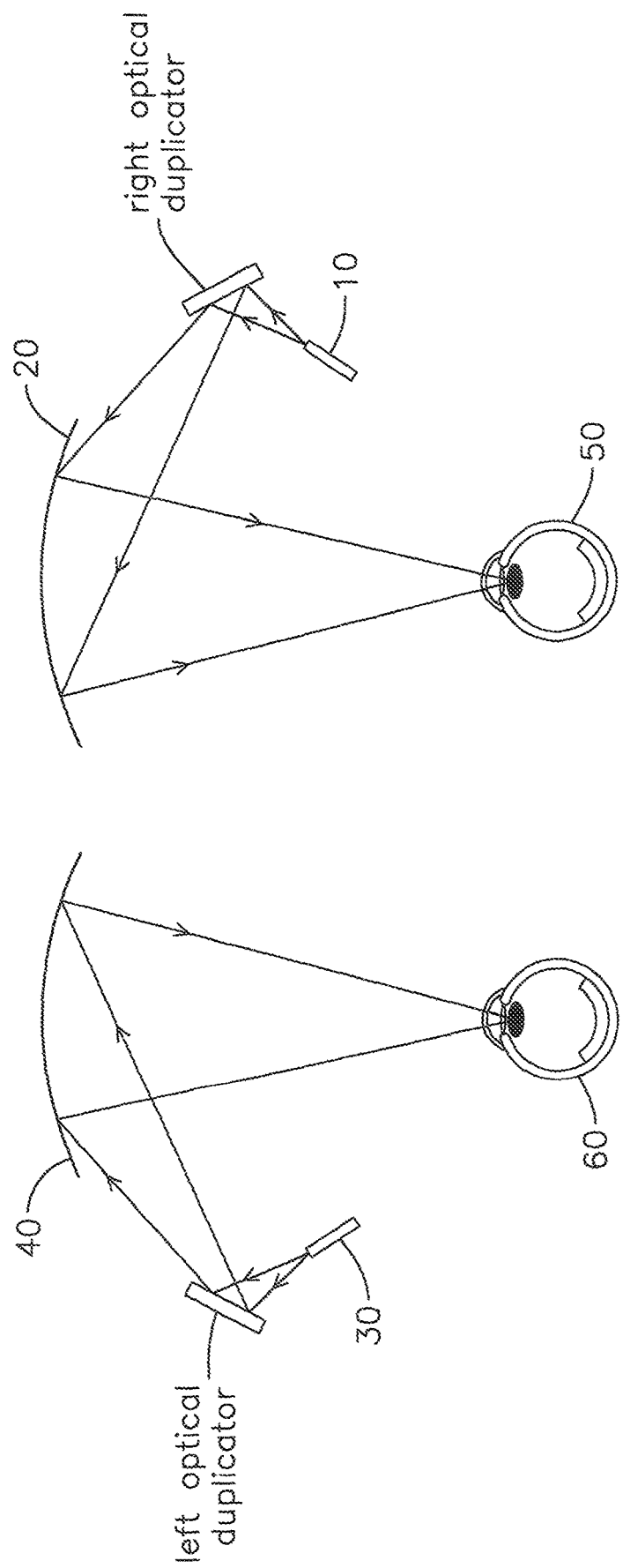
FIG. 9 is a schematic diagram illustrating an embodiment of object displaying system with optical duplicators in accordance with the present invention.

As shown in FIG. 9, the object displaying system may further include a right optical duplicator and a left optical duplicator. The optical duplicator can be positioned between the light signal generator 10, 30 and the combiner 20, 40 to duplicate incident light signals. As a result, the optical duplicator can generate multiple instances of the incident light signals to open eye box of the viewer. The optical duplicator may be beam splitters, polarizing splitter, half-silvered mirrors, partial reflective mirror, dichroic mirrored prisms, dichroic or dielectric optical coatings. The optical duplicator 110, 120 may comprise at least two optical components to duplicate the incident light signal into at least two instances. Each of the optical component may be one lens, reflector, partial reflector, prism, mirror, or a combination of the aforementioned.

The object displaying system may further include a control unit having all the necessary circuitry for controlling the right light signal generator and left light signal generator. The control unit provides electronic signals for the light signal generators to generate multiple light signals. In one embodiment, the position and angle of the right light signal generator and the left light signal generator can be adjusted to modify the incident angles of the right light signals and the left light signals to and the receiving locations on the right combiner and the left combiner. Such adjustment may be implemented by the control unit. The control unit may communicate with a separate image signal provider via a wired or wireless means. The wireless communication includes telecommunication such 4G and 5G, WiFi, bluetooth, near field communication, and internet. The control unit may include a processor, a memory, an I/O interface to communicate with the image signal provider and the viewer. The object displaying system further comprises a power supply. The power supply may be a battery and/or a component that can be wirelessly charged.

Figure 10:
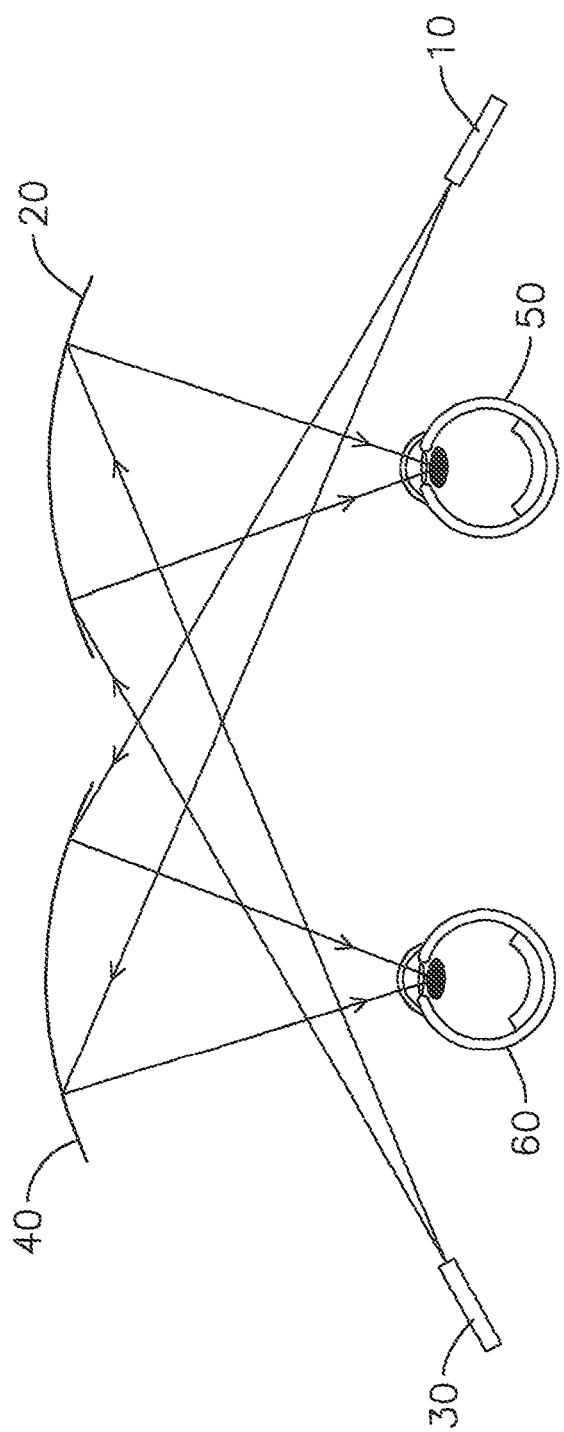
FIG. 10 is a schematic diagram illustrating an embodiment of an object displaying system in accordance with the present invention.

There are at least two options for arranging the light path from the light signal generator to the viewer's retina. The first option described above is that the right light signals generated by the right light signal generator are redirected by the right combiner to arrive the right retina and the left light signals generated by the left light signal generator are redirected by the left combiner to arrive the left retina. As shown in FIG. 10, the second option is that the right light signals generated by the right light signal generator are redirected by the left combiner to arrive the left retina and the left light signals generated by the left light signal generator are redirected by the right combiner to arrive the right retina.

Figure 11:
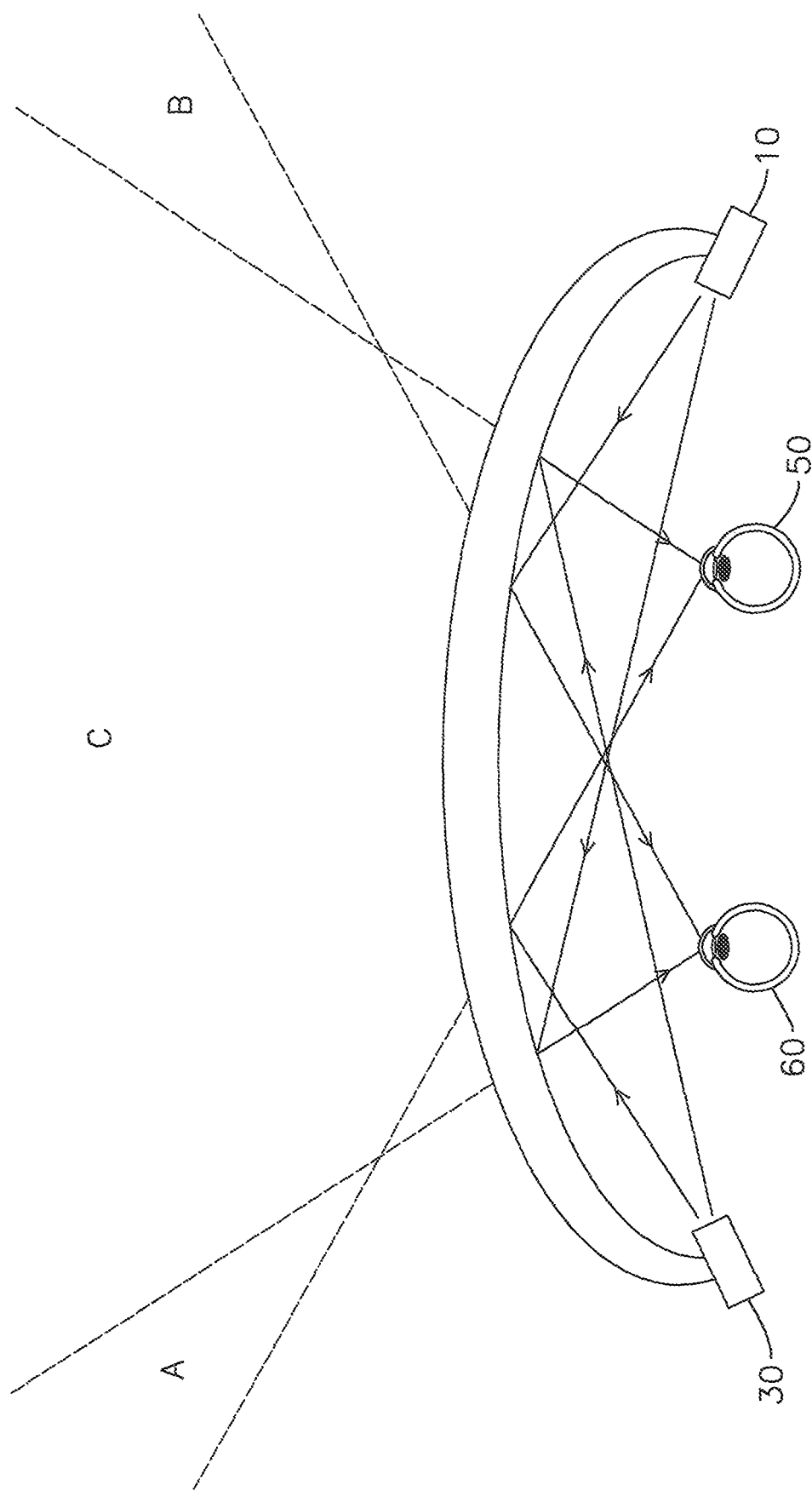
FIG. 11 is a schematic diagram illustrating a united combiner in accordance with the present invention.

In another embodiment shown in FIG. 11, the right combiner and the left combiner can be integrated into one united combiner with a specific curvature for both the right light signals and the left light signals. With this large combiner, the right light signals generated by the right signal generator are reflected to arrive the left retina and the left light signals generated by the left signal generator are reflected to arrive the right retina. By extending the width of the combiner to create a relatively large reflective surface, the FOV and the size of area C for binocular fusion may be expanded.

Figure 12:
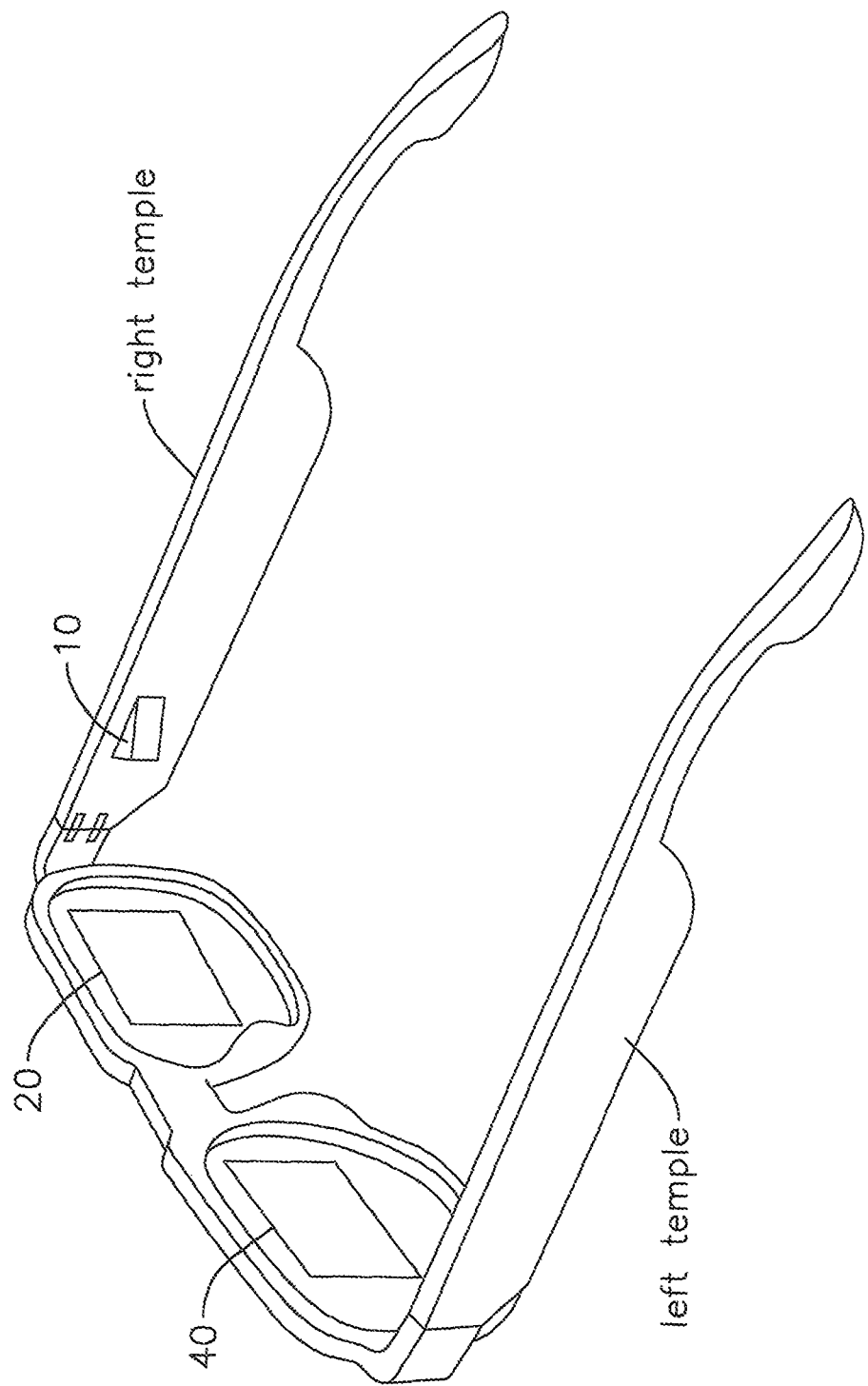
FIG. 12 is a schematic diagram illustrating a object displaying system carried by a pair of glasses in accordance with the present invention.

The object displaying system may include a support structure wearable on a head of the viewer to carry the right light signal generator, the left light signal generator, the right combiner, and the left combiner. The right combiner and the left combiner are positioned within a field of view of the viewer. Thus, in this embodiment, the object displaying system is a head wearable device (HWD). In particular, as shown in FIG. 12, the object displaying system is carried by a pair of glasses, which is referred to as smart glasses. In this situation, the support structure may be a frame of a pair of glasses with or without lenses. The lenses may be prescription lenses used to correct nearsightedness, farsightedness, etc. The right light signal generator is carried by a right temple of the frame. The left light signal generator is carried by a left temple of the frame. The right combiner may be carried by the right lens and the left combiner may be carried by the left lens. The carrying can be implemented in various manner. The combiner may be attached or incorporated to the lens by either a removable or a non-removable means. The combiner may be integratedly made with the lens, including prescription lens. When the support structure does not include lenses, the right combiner and the left combiner may be directly carried by the frame or rims.

All components and variations in the embodiments of the object displaying system described above may be applied to the HWD. Thus, the HWD, including smart glasses, may further carry other components of the object displaying system, such as a control unit, a right collimator and a left collimator. The right collimator may be positioned between the right light signal generator and the right combiner and the left collimator may be positioned between the left light signal generator and the left combiner. In addition, the combiner may be replaced by a beam splitter and a convergent lens. The function of the beam splitter is to reflect light signals and the function of the convergent lens is to converge light signals so that they can pass through pupils to arrive the viewer's retinas.

When the object displaying system is implemented on smart eyeglasses. The lenses of the smart eyeglasses may have both dioptric property for correcting the viewer's eyesight and the function of a combiner. The smart eyeglasses may have lenses with prescribed degrees to fit the need of individuals are near-sighted or far-sighted to correct their eyesight. In these circumstances, each of the lenses of the smart eyeglasses may comprise a dioptric unit and a combiner. The dioptric unit and the combiner can be integrally manufactured as one piece with the same or different type of material. The dioptric unit and the combiner can also be separately manufactured in two pieces and then assembled together. These two pieces can attached to each other but separable, for example with built-in magnetic material, or may be attached to each other permanently. In either situation, the combiner is provided on a side of the lense which is closer to the eyes of the viewer. If the lens is one piece, the combiner forms an inner surface of the lens. If the lens has two portions, the combiner forms the inner portion of the lens. The combiner both allows ambient light to pass through and reflects light signals generated by the light signal generators to the viewer's eyes to form virtual images in the real environment. The combiner is designed to have appropriate curvature to reflect and to converge all the light signals from the light signal generators into the pupils and then on the retinas of the eyes.

Figure 13:
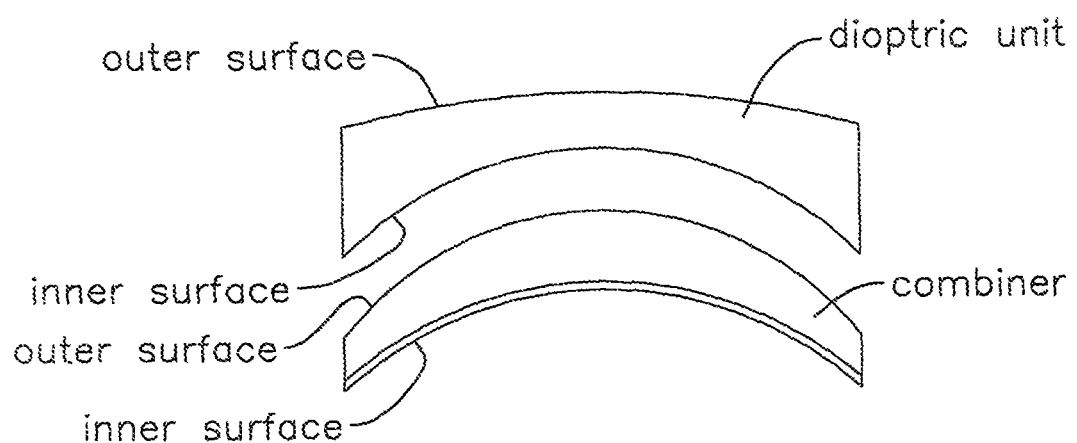
FIG. 13 is a schematic diagram illustrating a dioptric unit and a combiner in accordance with the present invention.

In some embodiments, the curvature of one of the surfaces of the dioptric unit is determined based on the viewer's dioptric prescription. If the lens is one piece, the prescribed curvature is the outer surface of the lens. If the lens has two portions, the dioptric unit forms the outer portion of the lens. In this situation, the prescribed curvature may be either the inner surface or the outer surface of the dioptric unit. To better match the dioptric unit and the combiner, in one embodiment, the dioptric unit can be categorized into three groups based on the its prescribed degrees—over +3.00 (farsighted), between −3.0-+3.0, and under −3.0 (nearsighted). The combiner can be designed according to the category of a dioptric unit. In another embodiment, the dioptric unit can be categorized into five or ten groups each of which has a smaller range of prescribed degrees. As shown in FIG. 13, when the outer surface of a dioptric unit is used to provide the curvature for the prescribed degrees, the inner surface of the dioptric unit may be designed to have the same curvature as the outer surface of the combiner. As a result, the dioptric unit may be better fitted to the combiner. As an example, the inner surface of the dioptric unit and the outer surface of the combiner may be a same spherical or ellipsoid surface. In other embodiments, when the inner surface of the dioptric unit is used to provide the curvature for the prescribed degree, the outer surface of the combiner may be designed to have the same or similar curvature as the inner surface of the dioptric unit for facilitating the coupling between the two. However, when the outer surface of the combiner does not have the same curvature as the inner surface of the dioptric unit, the outer surface of the combiner and the inner surface of the dioptric unit can be combined via mechanical means such as magnets, adhesive materials, or other coupling structures. Another option is that an intermediary material may be applied to assemble the dioptric unit and the combiner. Alternatively, the combiner may be coated on the inner surface of the lens.

In addition to a still virtual object in an image frame in space, the object displaying system can display the object in moving. When the right light signal generator 10 and the left light signal generator 30 can generate light signals at a high speed, for example 30, 60 or more frames/second, the viewer can see the object in moving in a video smoothly due to persistence of vision. Below describe various embodiments of the processes to display a moving virtual object for the viewer. FIGS. 14A-I respectively illustrate an object moving in examples 1-9. The objects shown in the right combiner image 82 and left combiner image 92 in these figures may not precisely reflect the locations of the corresponding right light signals and left light signals displaying the object. In addition, the examples set the middle point of the viewer's interpupillary line as the origin of the XYZ coordinate system. Furthermore, the RCI(10, 10) and the LCI(10, 10) are set to be respectively the center of the right combiner image and the left combiner image. Likewise, the RRI(10, 10) and the LRI(10, 10) are set to be respectively the center of the right retina image and the left retina image. The (0, 0) pixel is the top and left most pixel of each image.

Figure 14A:
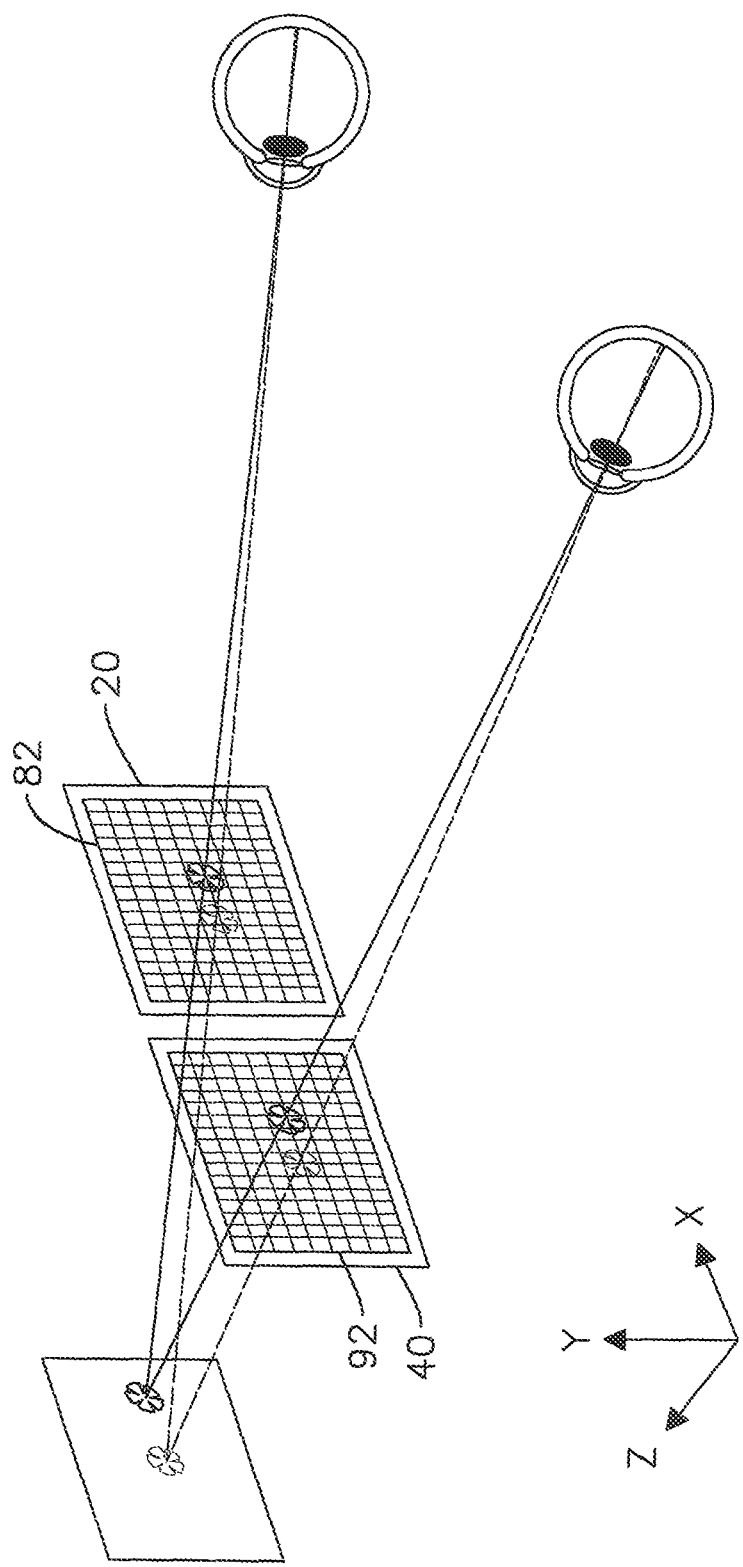
FIGS. 14A-I are schematic diagrams illustrating displaying a moving object in accordance with the present invention.

Example 1 shown in FIG. 14A illustrates a virtual object moving only in X axis direction (to the right) on the same depth plane from a first virtual binocular pixel to a second virtual binocular pixel. To do so, the locations of right light signals and the corresponding left light signals respectively on the right combiner image and the left combiner image need to be moved (to the right) with equal distance (pixels) in X axis direction. As a result, the locations of right light signals and the corresponding left light signals respectively on the right retina image and the left retina image forming the virtual object are moved to the left with equal distance in X axis direction. In other words, such right light signals and corresponding left light signals from the light signal generators have to be projected on a different X-coordinate location of the combiner images. However, since the Y-coordinate and Z-coordinate (the depth direction) of the virtual object remains the same, the right light signals and the corresponding left light signals are projected on the same location of the combiner images with respect to the Y-coordinate and Z-coordinate. For example, when the XYZ coordinate of the virtual object moves from (0, 0, 100) to (10, 0, 100), the right light signal on the right combiner image moves from RCI(10, 10) to RCI(12,10) and the left light signal on the left combiner image moves from LCI(10, 10) to LCI(12, 10). As a result, the right light signal on the right retina image moves from RRI(10, 10) to RRI(8,10) and the left light signal on the left retina image moves from LRI(10, 10) to LRI(8, 10).

Figure 14B:
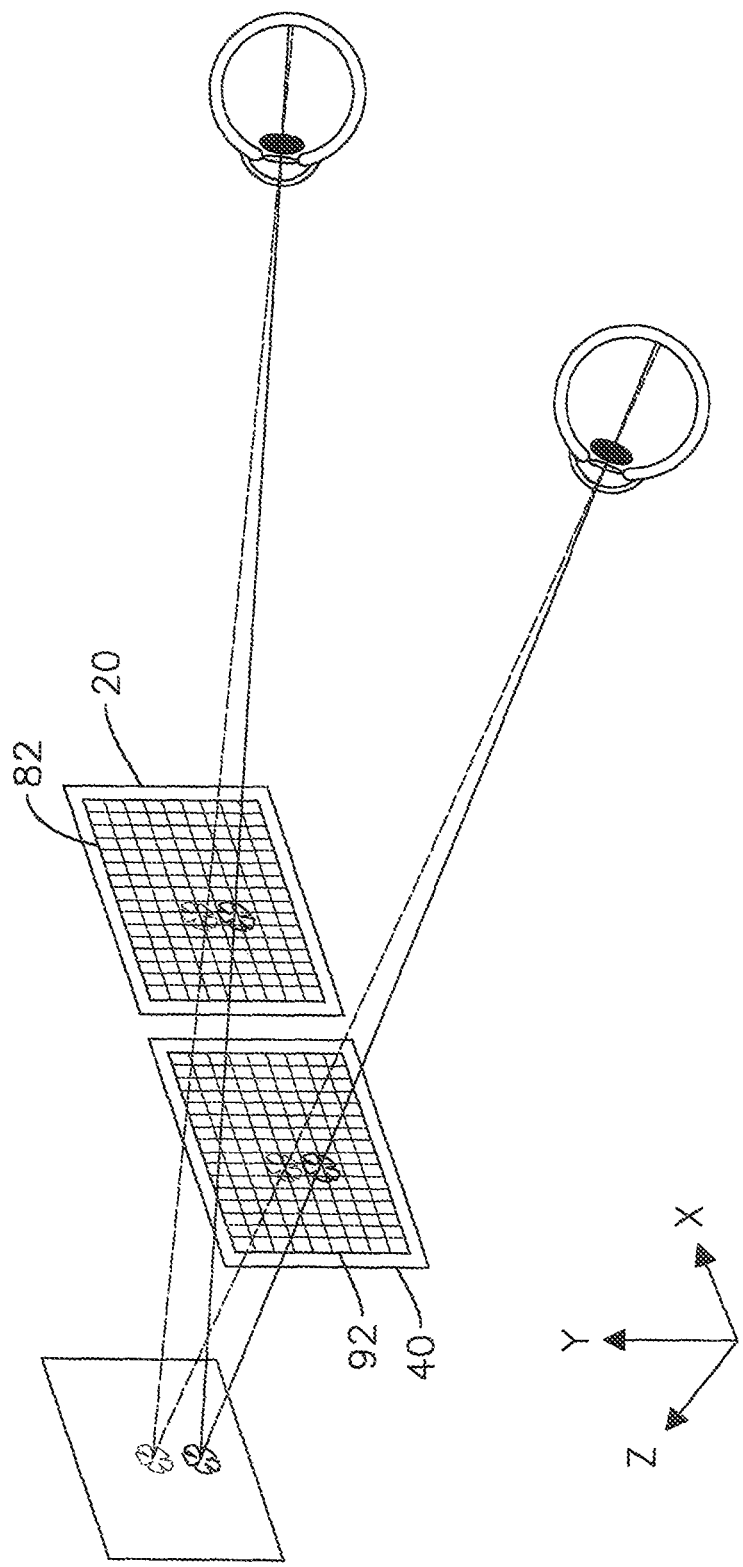

Example 2 shown in FIG. 14B illustrates a virtual object moving only along Y axis direction (to lower position) on the same depth plane from a first virtual binocular pixel to a second virtual binocular pixel. To do so, the locations of right light signals and the corresponding left light signals respectively on the right combiner image and the left combiner image need to be moved down with equal distance (pixels) along Y axis direction. As a result, the locations of right light signals and the corresponding left light signals respectively on the right retina image and the left retina image forming the virtual object are moved up with equal distance in Y axis direction. In other words, such right light signals and corresponding left light signals from the light signal generators have to be projected on a different Y-coordinate location of the combiner images. However, since the X-coordinate and Z-coordinate (the depth direction) of the virtual object remains the same, the right light signals and corresponding left light signals are projected on the same location of the combiner images with respect to the X-coordinate and Z-coordinate. For example, when the XYZ coordinate of the virtual object moves from (0, 0, 100) to (0, −10, 100), the right light signal on the right combiner image moves from RCI(10, 10) to RCI(10,12) and the left light signal on the left combiner image moves from LCI(10, 10) to LCI(10, 12). As a result, the right light signal on the right retina image moves from RRI(10, 10) to RRI(10, 8) and the left light signal on the left retina image moves from LRI(10, 10) to LRI(10, 8).

Figure 14C:
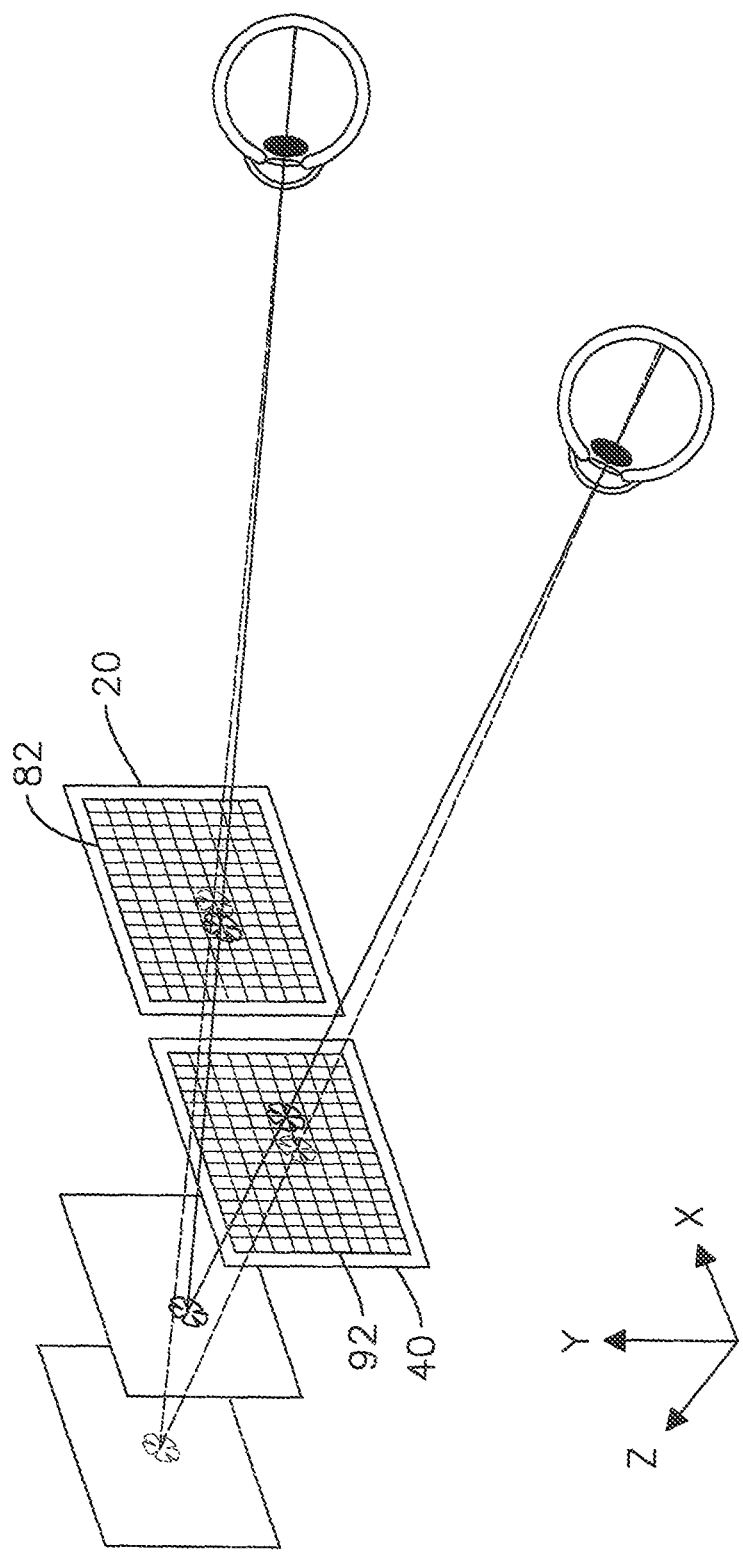

Example 3 shown in FIG. 14C illustrates a virtual object moving only along Z axis direction (closer to the viewer) and thus from an original depth plane to a new depth plane. To do so, the locations of right light signals and the corresponding left light signals respectively on the right combiner image and the left combiner image need to be moved closer to each other in X axis direction depending on the extent the convergence angle between the light path extension of the right light signals and the corresponding left light signals enlarges. As a result, the locations of right light signals and the corresponding left light signals respectively on the right retina image and the left retina image forming the virtual object are moved far away from each other in X axis direction. In sum, when the virtual object moves closer to the viewer, the relative distance between locations of right light signals and corresponding left light signals on the combiner images decreases, while the relative distance between locations of right light signals and corresponding left light signals on the retina images increases. In other words, such right light signals and corresponding left light signals from the light signal generators have to be projected on two different X-coordinate locations of the combiner images that are closer to each other. However, since the Y-coordinate of the virtual object remains the same, the right light signals and corresponding left light signals are projected on the same Y-coordinate location of the combiner images. For example, when the XYZ coordinate of the virtual object moves from (0, 0, 100) to (0, 0, 50), the right light signal on the right combiner image moves from RCI (10, 10) to RCI (5,10) and the left light signal on the left combiner image moves from LCI (10, 10) to LCI (15, 10). As a result, the right light signal on the right retina image moves from RRI (10, 10) to RRI (15, 10) and the left light signal on the left retina image moves from LRI (10, 10) to LRI (5, 10).

However, to move a virtual object closer to the viewer, if the X-coordinate of the virtual object is not at the center (middle point) of the interpupillary line (X-coordinate equals to zero in one embodiment), the locations of the right light signals and corresponding left light signals respectively on the right combiner image and the left combiner image need to be moved closer to each other based on a ratio. The ratio is calculated by the distance between the location of right light signal on the right combiner image and its left edge (close to the center of both eyes), to the distance between the location of left light signal on the left combiner image and its right edge (close to the center of both eyes). For example, assuming that the location of right light signal on the right combiner image is 10 pixels to its left edge (close to the center of both eyes) and the location of left light image on the left combiner image is 5 pixels to its right edge (close to the center of both eyes), The ration of right-location-to-center distance and left-location-to-center distance is 2:1 (10:5). To move the object closer, if the right location on the right combiner image and the left location on the left combiner image have to move closer to each other by 3 pixels distance, the right location needs to move towards its left edge by 2 pixels and the left location needs to move towards its right edge by 1 pixel because of the 2:1 ratio.

Figure 14D:
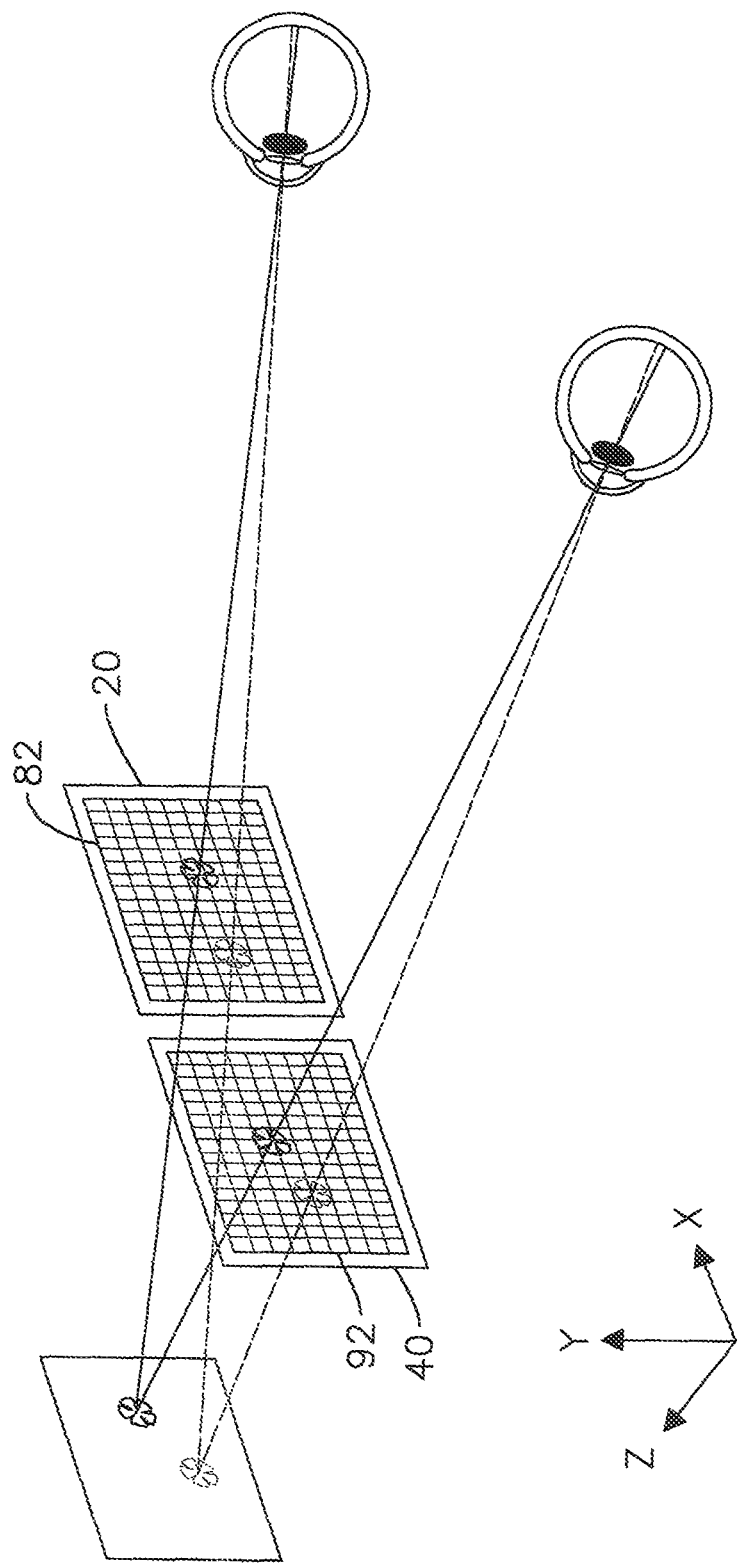

Example 4 shown in FIG. 14D illustrates the method for moving a virtual object in X axis direction (to the right) and Y axis direction (to higher position) in space on the same depth plane from a first virtual binocular pixel to a second virtual binocular pixel. To do so, the locations of right light signals and the corresponding left light signals respectively on the right combiner image and the left combiner image need to be moved to the right of and higher than the original location. As a result, the locations of right light signals and the corresponding left light signals respectively on the right retina image and the left retina image forming the virtual object are moved to the left of and lower than the original location. In other words, the right light signals and the corresponding left light signals from the light signal generators need to be projected on a new location of the right combiner image and the left combine image to the right of and higher than the original location while the convergence angle between the light path extension of the right light signals and the corresponding left light signals remains the same. For example, when the XYZ coordinate of the virtual object moves from (0, 0, 100) to (10, 10, 100), the right light signal on the right combiner image moves from RCI (10, 10) to RCI (12, 8) and the left light signal on the left combiner image moves from LCI (10, 10) to LCI (12, 8). As a result, the right light signal on the right retina image moves from RRI (10, 10) to RRI (8, 12) and the left light signal on the left retina image moves from LRI (10, 10) to LRI (8, 12).

Figure 14E:
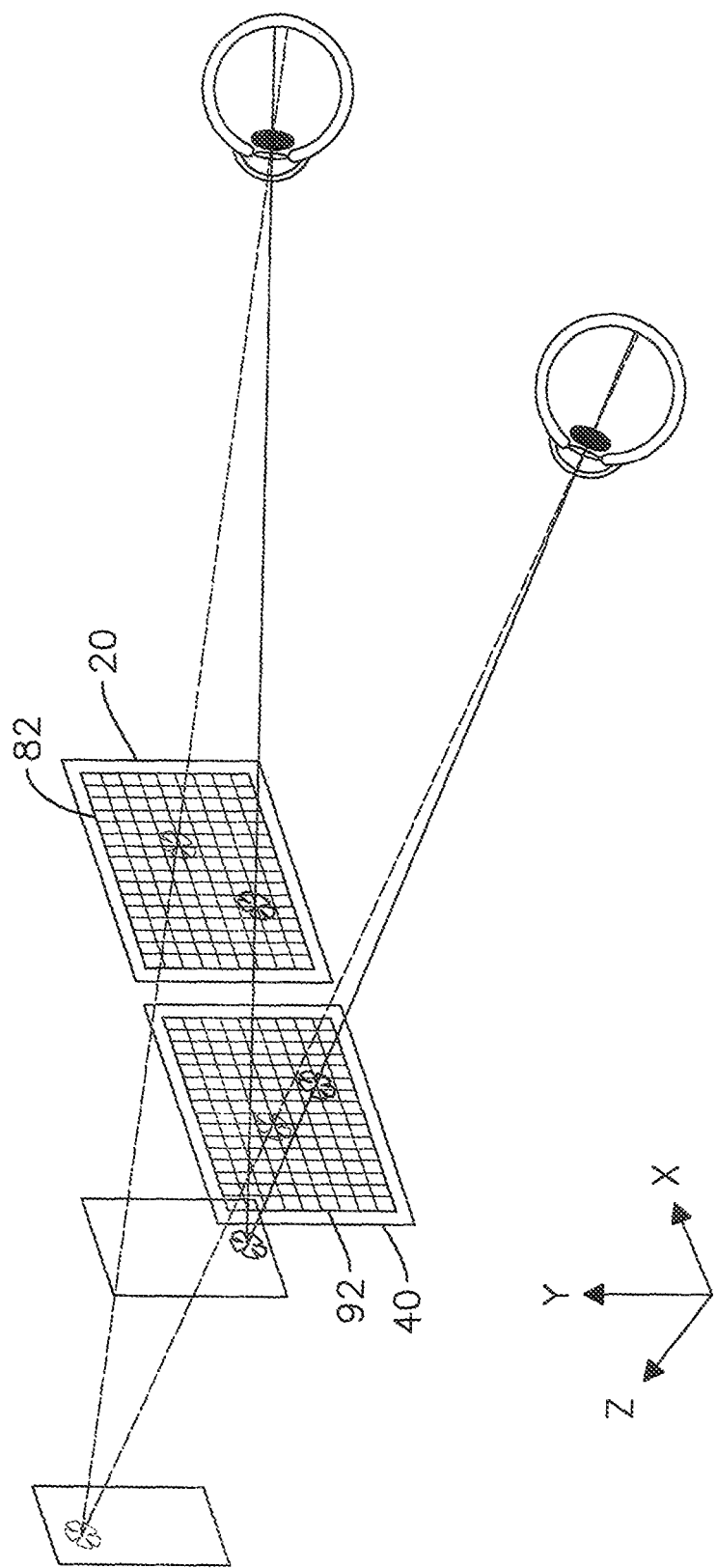

Example 5 shown in FIG. 14E illustrates a virtual object moving in Y axis direction (to lower position) and Z (closer to viewer) and thus from an original depth plane to a new depth plane. To do so, the locations of right light signals and the corresponding left light signals respectively on the right combiner image and the left combiner image need to be moved down in Y axis direction and closer to each other in X axis direction for a large convergence angle. As a result, the locations of right light signals and the corresponding left light signals respectively on the right retina image and the left retina image forming the virtual object are moved up in Y axis direction and far away from each other in X axis direction. In other words, such right light signals and corresponding left light signals from the light signal generators have to be projected on a different Y-coordinate location and two different X-coordinate locations (closer to each other) of the combiner images. For example, when the XYZ coordinate of the virtual object moves from (0, 0, 100) to (0, −10, 50), the right light signal on the right combiner image moves from RCI (10, 10) to RCI (5,12) and the left light signal on the left combiner image moves from LCI (10, 10) to LCI (15, 12). As a result, the right light signal on the right retina image moves from RRI (10, 10) to RRI (15, 8) and the left light signal on the left retina image moves from LRI (10, 10) to LRI (5, 8).

However, since the X-coordinate of the virtual object remains the same while the virtual object moves closer to the viewer, the locations of the right light signals and corresponding left light signals respectively on the right combiner image and the left combiner image need to be moved closer to each other based on a ratio. The ratio is calculated by the distance between the location of right light signal on the right combiner image and its left edge (close to the center of both eyes), to the distance between the location of left light signal on the left combiner image and its right edge (close to the center of both eyes). For example, assuming that the location of right light signal on the right combiner image is 10 pixels to its left edge (close to the center of both eyes) and the location of left light image on the left combiner image is 5 pixels to its right edge (close to the center of both eyes), The ration of right-location-to-center distance and left-location-to-center distance is 2:1 (10:5). To move the object closer, if the right location on the right combiner image and the left location on the left combiner image have to move closer to each other by 3 pixels distance, the right location needs to move towards its left edge by 2 pixels and the left location needs to move towards its right edge by 1 pixel because of the 2:1 ratio.

Figure 14F:
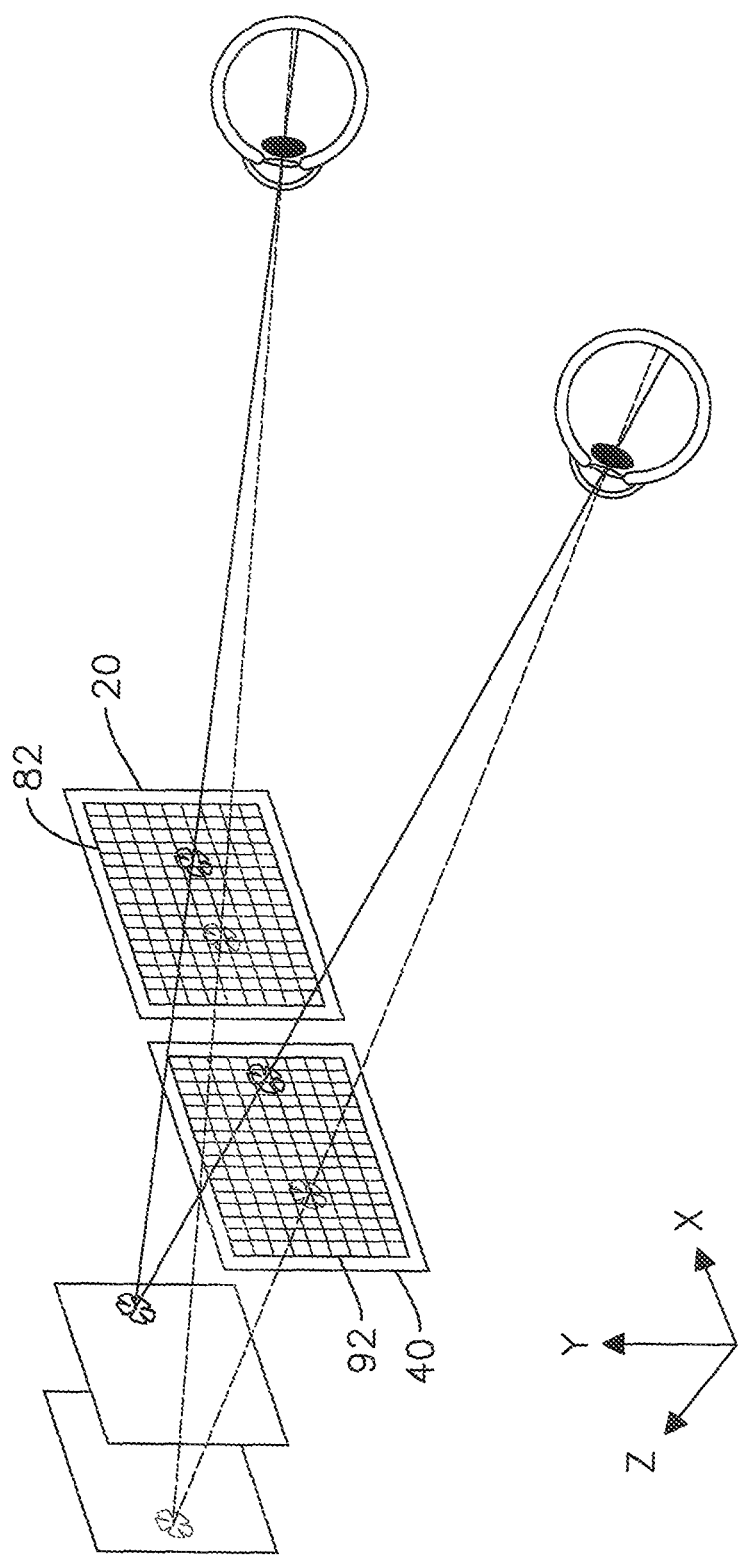

Example 6 shown in FIG. 14F illustrates a virtual object moving in X axis direction (to the right) and Z axis direction (closer to viewer) and thus from an original depth plane to a new depth plane. To do so, the locations of right light signals and the corresponding left light signals respectively on the right combiner image and the left combiner image need to be moved to the right in X axis direction and closer to each other in X axis direction for a large convergence angle. As a result, the locations of right light signals and the corresponding left light signals respectively on the right retina image and the left retina image forming the virtual object are moved to the left in X axis direction and far away from each other in X axis direction. In other words, such right light signals and corresponding left light signals from the light signal generators have to be projected on two different X-coordinate locations (to the right and closer to each other) of the combiner images. since the Y-coordinate of the virtual object remains the same, the right light signals and corresponding left light signals are projected on the same Y-coordinate location of the combiner images. For example, when the XYZ coordinate of the virtual object moves from (0, 0, 100) to (10, 0, 50), the right light signal on the right combiner image moves from RCI(10, 10) to RCI(7, 10) and the left light signal on the left combiner image moves from LCI(10, 10) to LCI(17, 10). As a result, the right light signal on the right retina image moves from RRI(10, 10) to RRI(13, 10) and the left light signal on the left retina image moves from LRI(10, 10) to LRI(3, 10).

Figure 14G:
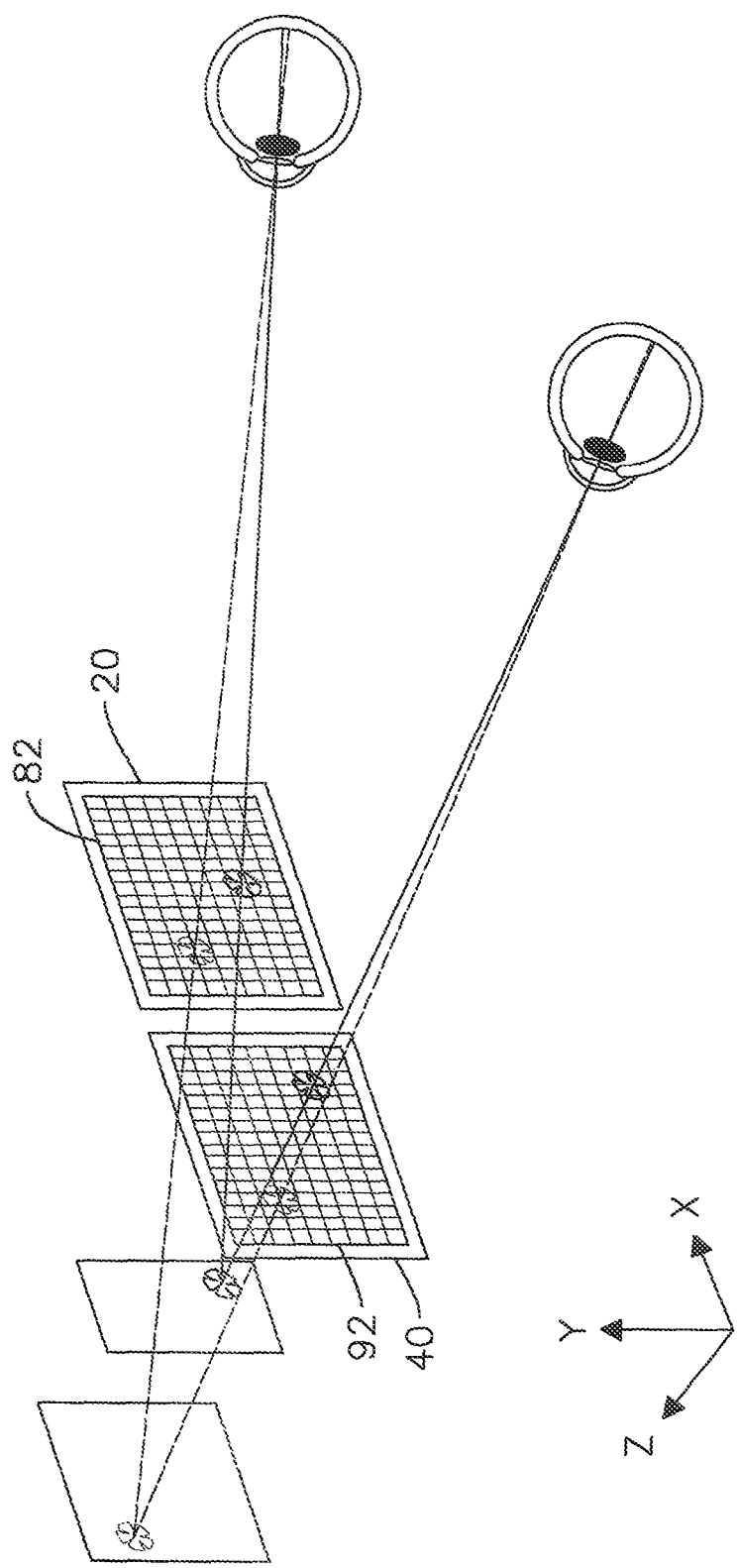

Example 7 shown in FIG. 14G illustrates the object moving in X axis direction (to the right), Y axis direction (to lower position), and Z axis direction (closer to viewer) and thus from an original depth plane to a new depth plane. To do so, the locations of right light signals and the corresponding left light signals respectively on the right combiner image and the left combiner image need to be moved to the right in X axis direction, to a lower position in Y axis direction, and closer to each other in X axis direction for a large convergence angle. As a result, the locations of right light signals and the corresponding left light signals respectively on the right retina image and the left retina image forming the virtual object are moved to the left in X axis direction, to a higher position in Y axis direction, and far away from each other in X axis direction. In other words, such right light signals and corresponding left light signals from the light signal generators have to be projected on two different X-coordinate locations (to the right and closer to each other) and a different Y-coordinate location of the combiner images. For example, when the XYZ coordinate of the virtual object moves from (0, 0, 100) to (10, −10, 50), the right light signal on the right combiner image moves from RCI(10, 10) to RCI(7, 12) and the left light signal on the left combiner image moves from LCI(10, 10) to LCI(17, 12). As a result, the right light signal on the right retina image moves from RRI(10, 10) to RRI(13, 8) and the left light signal on the left retina image moves from LRI(10, 10) to LRI(3, 8).

Figure 14H:
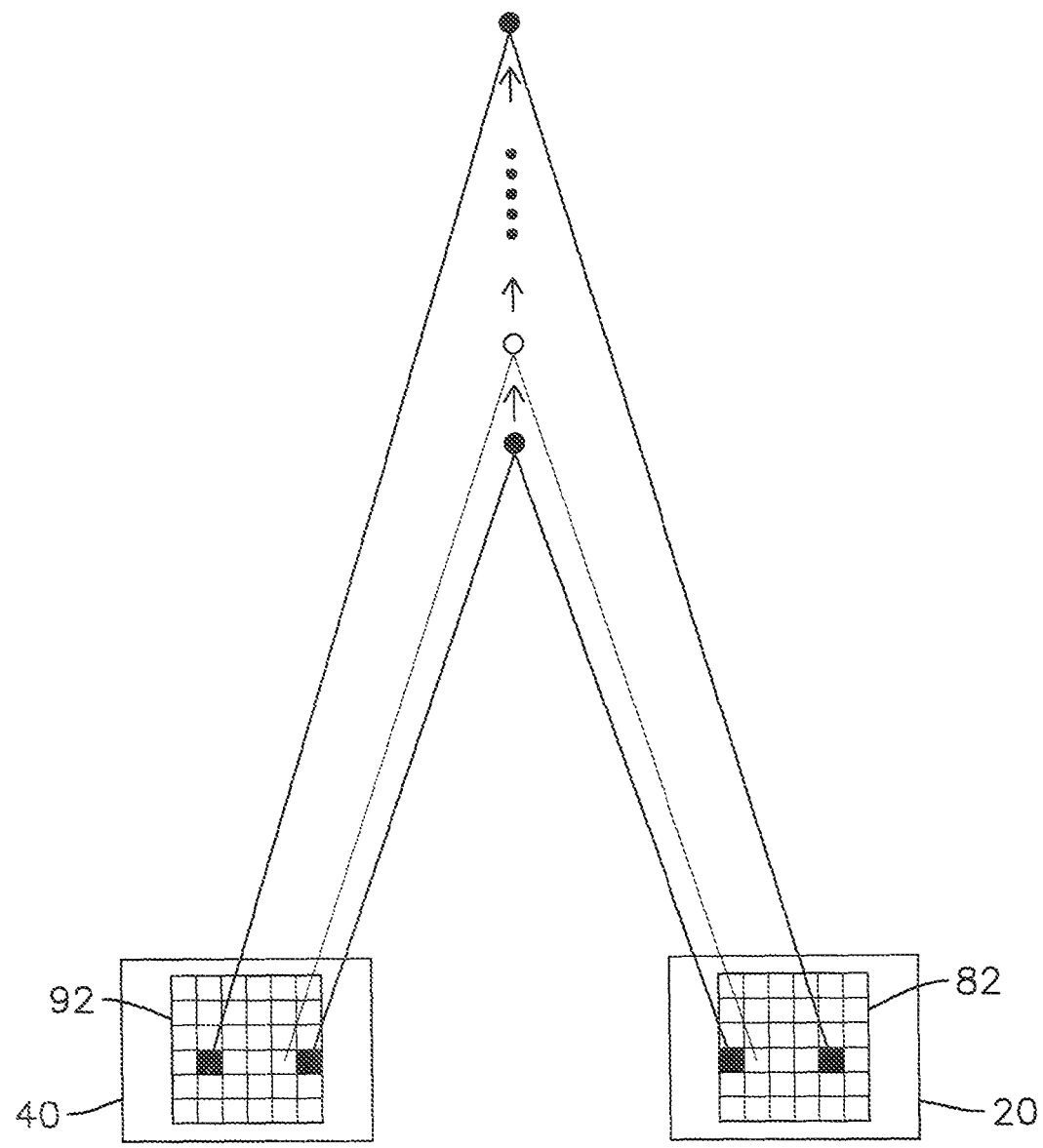

Example 8 shown in FIG. 14H illustrates a method of moving a virtual object in Z axis direction from 1 m depth to 10 m depth away from the viewer and thus from an original depth plane to a new depth plane in space. When the space in area C includes a sufficiently large number of virtual binocular pixels, the virtual object can be moved smoothly through many intermediate virtual binocular pixels. In other words, when the right retina image and the left retina image include a sufficiently large number of right pixels and left pixels, the viewer is able to perceive a gigantic amount of virtual binocular pixels in the space. In FIG. 14H, the object is represented by a round dot moving from a first virtual binocular pixel with 1 m depth to a second virtual binocular pixel with 10 m depth through various intermediate virtual binocular pixels. First, the convergence angle of the first virtual binocular pixel with 1 m depth is calculated to be 3.4 degrees between the light path extension of the first redirected right light signal and the first redirected left light signal.

$$\text{Tan}\left(\frac{\theta}{2}\right) = \frac{IPD}{2D} = 60 \text{ mm}/(2*10m) = 0.003. \text{ If } IPD = 60 \text{ mm},$$

$$\Theta = 0.34 \text{ degree}.$$

Second, the convergence angle of the second virtual binocular pixel with 10 m depth is calculated to be 0.34 degrees between the light path extension of the second redirected right light signal and the second redirected left light signal.

$$\mathrm{Tan}\left(\frac{\theta}{2}\right) = \frac{IPD}{2D} = 60 \text{ mm}/(2*1m) = 0.03. \text{ If } IPD = 60 \text{ mm},$$

$$\Theta = 3.4 \text{ degree.}$$

Third, the intermediate virtual binocular pixels are calculated and identified. The number of intermediate virtual binocular pixels may be calculated based on the difference of convergence angles of the first virtual binocular pixel and the second virtual binocular pixel, and the number of pixels in X axis direction for every degree of FOB. The difference between the convergence angle of the first virtual binocular pixel (3.4 degree) and that of the second virtual binocular pixel (0.34 degree) equals 3.06. The number of pixels in X axis direction for every degree of FOB is 32, assuming that the total width of a scanned retina image is 1280 pixels which cover 40 degrees of field of view (FOV) in total. Thus, when the virtual object is moving from a first virtual binocular pixel with 1 m depth to a second virtual binocular pixel with 10 m depth, there are approximately 98 (32×3.06) virtual binocular pixels in between that can be used to display such a moving. These 98 virtual binocular pixels may be identified through the look up table described above. Fourth, display the moving through 98 intermediate virtual binocular pixels, like 98 steps of small moves in between in this example. The right light signals and the corresponding left light signals for these 98 virtual binocular pixels are respectively generated by the right light signal generator and left light signal generator to project into the right retina and the left retina of the viewer. As a result, the viewer can perceive a virtual object moving smoothly through 98 intermediate positions from 1 m to 10 m.

Figure 14I:
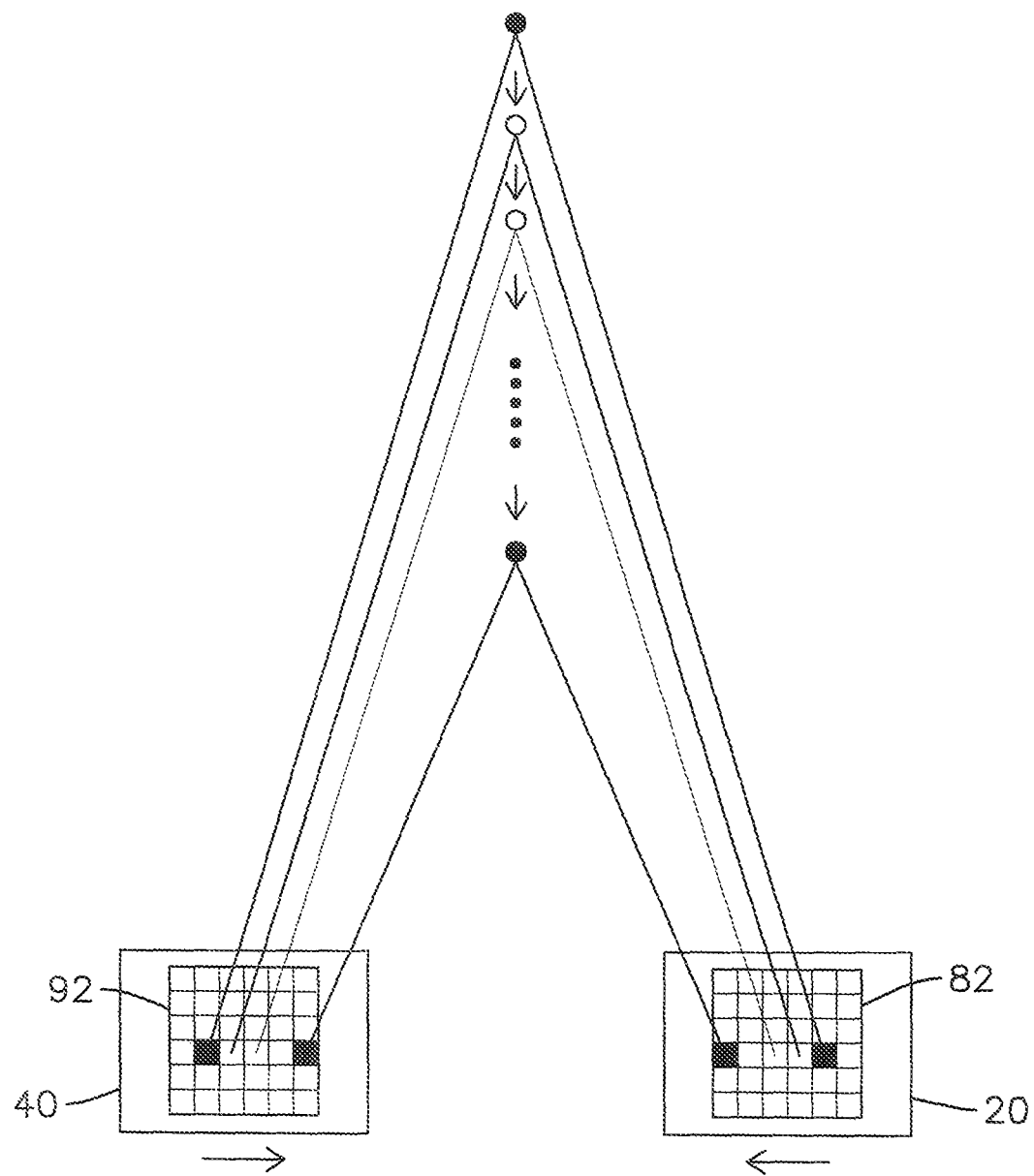

Example 9 shown in FIG. 14I illustrates a method of moving a virtual object in Z axis direction from 1 m depth to 20 cm depth closer to the viewer and thus from an original depth plane to a new depth plane in space. When the space in area C includes a sufficiently large number of virtual binocular pixels, the virtual object can be moved smoothly through many intermediate virtual binocular pixels. In other words, when the right retina image and the left retina image include a sufficiently large number of right pixels and left pixels, the viewer is able to perceive a gigantic amount of virtual binocular pixels in the space. In FIG. 14I, the object is represented by a round dot moving from a first virtual binocular pixel with 1 m depth to a second virtual binocular pixel with 20 cm depth through various intermediate virtual binocular pixels. First, the convergence angle of the first virtual binocular pixel with 1 m depth is calculated to be 3.4 degrees between the light path extension of the first redirected right light signal and the first redirected left light signal.

$$\mathrm{Tan}\left(\frac{\theta}{2}\right) = \frac{IPD}{2D} = 60 \text{ mm}/(2*1m) = 0.03. \text{ If } IPD = 60 \text{ mm},$$

$$\Theta = 3.4 \text{ degree.}$$

Second, the convergence angle of the second virtual binocular pixel with 20 cm depth is calculated to be 17 degrees between the light path extension of the second redirected right light signal and the second redirected left light signal.

$$\mathrm{Tan}\left(\frac{\theta}{2}\right) = \frac{IPD}{2D} = 60 \text{ mm}/(2*20 \text{ cm}) = 0.15. \text{ If } IPD = 60 \text{ mm},$$

$$\Theta = 17 \text{ degree.}$$

Third, the intermediate virtual binocular pixels are calculated and identified. The number of intermediate virtual binocular pixels may be calculated based on the difference of convergence angles of the first virtual binocular pixel and the second virtual binocular pixel, and the number of pixels in X axis direction for every degree of FOB. The difference between the convergence angle of the first virtual binocular pixel (3.4 degree) and that of the second virtual binocular pixel (17 degree) equals 13.6. The number of pixels in X axis direction for every degree of FOB is 32, assuming that the total width of a scanned retina image is 1280 pixels which cover 40 degrees of field of view (FOV) in total. Thus, when the virtual object is moving from a first virtual binocular pixel with 1 m depth to a second virtual binocular pixel with 20 cm depth, there are approximately 435 (32×13.6) virtual binocular pixels in between that can be used to display such a moving. These 435 virtual binocular pixels may be identified through the look up table described above. Fourth, display the moving through 435 intermediate virtual binocular pixels, like 435 steps of small moves in between in this example. The right light signals and the corresponding left light signals for these 435 virtual binocular pixels are respectively generated by the right light signal generator and left light signal generator to project into the right retina and the left retina of the viewer. As a result, the viewer can perceive a virtual object moving smoothly through 435 intermediate positions from 1 m to 10 m.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A system for displaying an object with depths comprising:
    a right light signal generator generating multiple right light signals for an object, each right light signal being a collimated narrow light beam of a right pixel;
    a right combiner receiving and redirecting the multiple right light signals towards one retina of a right eye of a viewer to display multiple right pixels of the object;
    a left light signal generator generating multiple left light signals for the object, each left light signal being a collimated narrow light beam of a left pixel;
    a left combiner receiving and redirecting the multiple left light signals towards another retina of a left eye of the viewer to display multiple left pixels of the object; and wherein a first redirected right light signal and a corresponding first redirected left light signal are respectively collimated and enter the right eye and the left eye of the viewer as collimated narrow light beams and are perceived by the viewer to display a first virtual binocular pixel of the object with a first depth that is related to a first angle between the first redirected right light signal and the corresponding first redirected left light signal, wherein a second redirected right light signal and a corresponding second redirected left light signal are respectively collimated and enter the right eye and the left eye of the viewer as collimated narrow light beams and are perceived by the viewer to display a second virtual binocular pixel of the object with a second depth that is related to a second angle between the second redirected right light signal and the corresponding second redirected left light signal, and wherein the first angle and the second angle are not equal.

2. The system of claim 1, wherein the first depth is determined by the first angle between light path extensions of the first redirected right light signal and the corresponding first redirected left light signal.

3. The system of claim 1, wherein the first redirected right light signal and the corresponding first redirected left light signals are directed to approximately the same height of the retina of the viewer's both eyes.

4. The system of claim 1, wherein the first redirected right light signal has approximately the same view angle as that of the corresponding first redirected left light signal.

5. The system of claim 1, wherein the multiple right light signals generated from the right light signal generator are reflected only once before entering the retina of the viewer, and the multiple left light signals generated from the left light signal generator are reflected only once before entering the other retina of the viewer.

6. The system of claim 1, wherein the right light signal generator is a right laser beam scanning projector (LBS projector) and the multiple right light signals generated from the right LBS projector are reflected only once by the right combiner before entering the retina of the viewer, and the left light signal generator is a left LBS projector and the multiple left light signals generated from the left LBS projector are reflected only once by a left combiner before entering the other retina of the viewer.

7. The system of claim 1, wherein the right combiner and the left combiner are transparent for ambient lights.

8. The system of claim 1, wherein the right combiner receiving and redirecting the multiple left light signals towards a right retina of the viewer to display multiple right pixels of the object and the left combiner receiving and redirecting the multiple right light signals towards a left retina of the viewer to display multiple left pixels of the object.

9. The system of claim 1, wherein the right combiner and the left combiner are ellipsoid-shaped, and the right light signal generator is positioned on one focus of the right combiner and the left light signal generator is positioned on one focus of the left combiner.

10. The system of claim 1, wherein a right projecting angle of the right light signal generator is adjustable to modify an incident angle of the multiple right light signals to the right combiner and a left projecting angle of the left light signal generator is adjustable to modify an incident angle of the multiple left light signals to the left combiner.

11. The system of claim 1, further comprising:
a support structure wearable on a head of the viewer;
wherein the right light signal generator and the left light signal generator are carried by the support structure; and
wherein the right combiner and the left combiner are carried by the support structure and positioned within a field of view of the viewer.

12. The system of claim 11, wherein the support structure is a pair of glasses.

13. The system of claim 12, wherein the pair of glasses has a prescription lens which carries the right combiner or the left combiner.

14. The system of claim 12, wherein the pair of glasses has a prescription lens integratedly made with the right combiner or the left combiner.

15. The system of claim 12, wherein the prescription lens and either the right combiner or the left combiner are attached with each other but separable.

16. The system of claim 11, wherein the right combiner and the left combiner are integrated into one united combiner.

17. The system of claim 1, further comprising:
a control unit to provide electronic signals for the right light signal generator and the left light signal generator to respectively control a direction of the first right light signal and the first left light signal so that the viewer perceives the first virtual binocular pixel of the object at a predetermined 3D coordinate based on a look up table.

18. The system of claim 17, wherein the look up table comprises a pair of a 2D right pixel coordinate and a corresponding 2D left pixel coordinate for the predetermined 3D coordinate of the first virtual binocular pixel.

19. The system of claim 18, wherein the look up table further comprises a scale of size, a number of overlapping objects, and/or a depth in sequence for a virtual binocular pixel.

20. The system of claim 17, wherein when an XYZ coordinate is used, a Z coordinate of the first virtual binocular pixel is determined by a horizontal distance between a right pixel X coordinate and a left pixel X coordinate.

21. The system of claim 17, wherein the look up table is calibrated based on an interpupillary distance of the viewer.

22. The system of claim 1, wherein the first depth is determined by the relative horizontal distance between first redirected right light signal and the corresponding first redirected left light signal.

23. The system of claim 1, wherein the viewer perceives the first virtual binocular pixel at a first predetermined 3D coordinate related to a first angle between the first redirected right light signal and the corresponding first redirected left light signal at a first time, and a second virtual binocular pixel at a second predetermined 3D coordinate related to a second angle between a second redirected right light signal and a corresponding second redirected left light signal at a second time.

24. The system of claim 23, wherein the first virtual binocular pixel displays approximately the same part of the object as the second virtual binocular pixel and the first time and the second time are within the time period of persistence of vision so that the viewer perceives the object in moving.

25. The system of claim 23, wherein the first virtual binocular pixel displays a different part of the object as the second virtual binocular pixel and the first time and the second time are within the time period of persistence of vision so that the viewer perceives different parts of the object concurrently.

26. The system of claim 23, wherein when the second virtual binocular pixel is perceived to be closer to the viewer than the first virtual binocular pixel, the second angle is larger than the first angle, and a second relative horizontal distance between the second redirected right light signal and the corresponding second redirected left light signal is larger than a first relative horizontal distance between the first redirected right light signal and the corresponding first redirected left light signal.

27. The system of claim 1, wherein the first right light signal is projected onto a predetermined location of one retina of the viewer and the corresponding left light signal is projected onto a predetermined location of the other retina of the viewer concurrently.

28. A method for displaying an object with depths comprising:
generating multiple right light signals for the object from a right light signal generator, each right light signal being a collimated narrow light beam of a right pixel;
redirecting the multiple right light signals to one retina of a right eye of a viewer;
generating multiple left light signals for the object from a left light signal generator, each left light signal being a collimated narrow light beam of a left pixel;
redirecting the multiple left light signals to another retina of a left eye of the viewer;
wherein a first redirected right light signal and a corresponding first redirected left light signal are respectively collimated and enter the right eye and the left eye of the viewer as collimated narrow light beams and are perceived by the viewer to display a first virtual binocular pixel of the object with a first depth that is related to a first angle between the first redirected right light signal and the corresponding first redirected left light signal,
wherein a second redirected right light signal and a corresponding second redirected left light signal are respectively collimated and enter the right eye and the left eye of the viewer as collimated narrow light beams and are perceived by the viewer to display a second virtual binocular pixel of the object with a second depth that is related to a second angle between the second redirected right light signal and the corresponding second redirected left light signal, and
wherein the first angle and the second angle are not equal.

29. The method of claim 28, wherein the first depth is determined by the first angle between light path extensions of the first redirected right light signal and the corresponding first redirected left light signal.

30. The method of claim 28, wherein the first redirected right light signal and the corresponding first redirected left light signals are directed to approximately the same height of the retina of the viewer's both eyes.

31. The method of claim 28, wherein the first redirected right light signal has approximately the same view angle as that of the corresponding first redirected left light signal.

32. The method of claim 28, wherein the multiple right light signals generated from the right light signal generator are reflected only once before entering the retina of the viewer, and the multiple left light signals generated from the left light signal generator are reflected only once before entering the other retina of the viewer.

33. The method of claim 28, wherein the right light signal generator is a right laser beam scanning projector (LBS projector) and the multiple right light signals generated from the right LBS projector are reflected only once by the right combiner before entering the retina of the viewer, and the left light signal generator is a left LBS projector and the multiple left light signals generated from the left LBS projector are reflected only once by a left combiner before entering the other retina of the viewer.

34. The method of claim 28, wherein the right combiner and the left combiner are transparent for ambient lights.

35. The method of claim 28, wherein the right combiner receiving and redirecting the multiple left light signals towards a right retina of a viewer to display multiple right pixels of the object and the left combiner receiving and redirecting the multiple right light signals towards a left retina of the viewer to display multiple left pixels of the object.

36. The method of claim 28, wherein the right combiner and the left combiner are ellipsoid-shaped, and the right light signal generator is positioned on one focus of the right combiner and the left light signal generator is positioned on one focus of the left combiner.

37. The method of claim 28, wherein a right projecting angle of the right light signal generator is adjustable to modify an incident angle of the multiple right light signals to the right combiner and a left projecting angle of the left light signal generator is adjustable to modify an incident angle of the multiple left light signals to the left combiner.

38. The method of claim 28:
wherein the right light signal generator and the left light signal generator are carried by a support structure wearable on a head of the viewer; and
wherein the right combiner and the left combiner are carried by the support structure and positioned within a field of view of the viewer.

39. The method of claim 38, wherein the support structure is a pair of glasses having a prescription lens which carries the right combiner or the left combiner.

40. The method of claim 38, wherein the right combiner and the left combiner are integrated into one united combiner.

41. A system for displaying an object with depths comprising:
a right light signal generator generating multiple right light signals for an object, each right light signal being a collimated narrow light beam of a right pixel;
a left light signal generator generating multiple left light signals for the object, each left light signal being a collimated narrow light beam of a left pixel; and
wherein a first right light signal and a corresponding first left light signal are respectively collimated and enter a right eye and a left eye of a viewer as collimated narrow light beams and are respectively projected onto a right retina and a left retina of the right eye and left eye of the viewer, and are perceived by the viewer to display a first virtual binocular pixel of the object with a first depth that is related to a first angle between the first right light signal before projecting onto the right retina and the corresponding first left light signal before projecting onto the left retina,
wherein a second right light signal and a corresponding second left light signal are respectively collimated and enter the right eye and the left eye of the viewer as collimated narrow light beams and are respectively projected onto the right retina and the left retina of the right eye and left eye of the viewer, and are perceived by the viewer to display a second virtual binocular pixel of the object with a second depth that is related to a second angle between the second right light signal before projecting onto the right retina and the corresponding second left light signal before projecting onto the left retina, and wherein the first angle and the second angle are not equal.

* * * * *